(12) United States Patent
Evdokimo et al.

(10) Patent No.: US 11,301,889 B2
(45) Date of Patent: Apr. 12, 2022

(54) WEB-BASED SEARCH AND BIDDING SYSTEM AND METHOD

(71) Applicants: Allen J Evdokimo, Reno, NV (US); Leslie K. Nielsen, Waddell, AZ (US)

(72) Inventors: Allen J Evdokimo, Reno, NV (US); Leslie K. Nielsen, Waddell, AZ (US)

(*) Notice: Subject to any disclaimer, the term of this patent is extended or adjusted under 35 U.S.C. 154(b) by 195 days.

(21) Appl. No.: 16/275,273

(22) Filed: Feb. 13, 2019

(65) Prior Publication Data

US 2019/0180304 A1    Jun. 13, 2019

Related U.S. Application Data

(62) Division of application No. 14/949,878, filed on Nov. 23, 2015, now abandoned.

(60) Provisional application No. 62/083,157, filed on Nov. 21, 2014.

(51) Int. Cl.
| | |
|---|---|
| *G06Q 30/00* | (2012.01) |
| *G06Q 30/02* | (2012.01) |
| *G06Q 30/08* | (2012.01) |
| *G06Q 30/06* | (2012.01) |

(52) U.S. Cl.
CPC ..... *G06Q 30/0206* (2013.01); *G06Q 30/0617* (2013.01); *G06Q 30/08* (2013.01)

(58) Field of Classification Search
CPC .......................... G06Q 30/0206; G06Q 30/08
See application file for complete search history.

(56) References Cited

U.S. PATENT DOCUMENTS

| | | | | |
|---|---|---|---|---|
| 7,330,826 B1* | 2/2008 | Porat | ............... | G06Q 30/0601 705/26.3 |
| 2002/0016779 A1* | 2/2002 | Roll | ............... | G06Q 30/0283 705/400 |
| 2005/0114229 A1* | 5/2005 | Ackley | ............... | G06Q 30/0601 705/26.1 |
| 2005/0197946 A1* | 9/2005 | Williams | ............... | G06Q 30/0247 705/36 R |
| 2007/0226113 A1* | 9/2007 | Johnson | ............... | G06Q 40/06 705/36 R |
| 2008/0215476 A1* | 9/2008 | Rabenold | ............... | G06Q 40/04 705/37 |

(Continued)

OTHER PUBLICATIONS

Said, Maher. "Auctions with dynamic populations: Efficiency and revenue maximization." Journal of Economic Theory 147.6 (2012): 2419-2438.*

*Primary Examiner* — Kathleen Palavecino
(74) *Attorney, Agent, or Firm* — Long & Chybik; John D. Long, Esq.

(57) ABSTRACT

A method of accepting a bid for an item offered for sale through an internet web portal comprising the following steps: listing with an internet web portal bid program by an item being sold by a merchant; accessing the internet web portal bid program by a user to obtain of bid information of the item; placing with the internet web portal bid program by the registered user of a bid for the item, the bid containing a price that the registered user will pay for the item; presenting by the internet web portal bid program to the registered merchant of one or more economic factors to assist the registered merchant in selecting at least one bid from the one or more bids as a winning bid, one or more economic factors being based on item information and being other than the bid price.

17 Claims, 28 Drawing Sheets

(56) References Cited

U.S. PATENT DOCUMENTS

| | | | |
|---|---|---|---|
| 2014/0108293 A1* | 4/2014 | Barrett | G06Q 40/04 705/36 R |
| 2014/0351031 A1* | 11/2014 | Randel | G06Q 30/0212 705/14.14 |
| 2015/0039388 A1* | 2/2015 | Rajaraman | G06Q 30/0222 705/7.29 |
| 2015/0100354 A1* | 4/2015 | Horowitz | G06Q 10/02 705/5 |
| 2015/0310794 A1* | 10/2015 | Gille | H04N 9/73 345/594 |
| 2015/0379596 A1* | 12/2015 | Li | G06Q 10/083 705/26.2 |
| 2016/0042447 A1* | 2/2016 | Nassiri | G06Q 30/0641 705/26.3 |
| 2019/0197625 A1* | 6/2019 | Reiter | G06F 16/26 |

* cited by examiner

WEB-BASED SEARCH AND BIDDING SYSTEM AND METHOD

STATEMENT REGARDING FEDERALLY SPONSORED RESEARCH OR DEVELOPMENT

Not Applicable

REFERENCE TO A "MICROFICHE APPENDIX"

Not Applicable.

FIELD OF THE INVENTION

The present invention may relate to web-based searching and bidding methods and systems. More particularity to those web-based searching and bidding methods and systems that compare and contrast items, products, services or the like that are available for purchase or sale through the internet.

BACKGROUND

Various data and information can be accessed through a global system of interconnected computer networks that uses a standardized protocol to link several billion devices worldwide (e.g., the internet) that is used to support an operation of an information system (e.g., world wide web or www) that allows documents to be connected to other documents by protocol-based (http) links, enabling the user to search for information by moving from one document to another.

The information system may be used to search and locate data on desired items (e.g., a good, service, information or the like) that a person is desirous to obtain as well as obtain a sufficient amount of comparative information to make an informed and judicious purchase for such an item through the internet. The websites and web portals that may be visited during such an information search include ones that only provide descriptive information about the item class as well as those which further provide cost, purchase and point of sale information about the item within the class. In conducting such an information search, an operator or user may use one or more search engines (e.g., search programs that utilizing character or text association search capabilities to locate and access websites/web portals that have said same or similar text or characters located with the website/portal.) Once such web search is conducted and a suitable list of web portals/websites containing the desired texted generated by the search engine in response to the search request, the list may be so enabled to provide links (e.g., hypertext) linking to the websites/web portals on the list may then be activated to open a window (e.g., visual display) for each website or portal so selected. The user may then attempt to obtain the desired information from viewing the presented pages of the selected website or portal as shown through the respective widow. Using the information as presented from the one or more respective windows, the user may make a choice about an item and then subsequently purchase the item through the internet (or through non-internet based procurement means—e.g., calling the retail merchant directly to order and pay for the product.)

One possible significant inconvenience, if not an outright impendence, provided by such an information and purchasing online system (and associated method[s] of operation and use) is the need for the user to substantially juggle several online windows at once to compare and sort out contrasting or conflicting information taken from each online window one at a time in into a single source or presentation (e.g., a single window.) Another possible inconvenience is that these multiple window type online searches are generally considered to be a horizontal search (e.g., gathering data from distinct and different databases) rather than a more efficient vertical search (e.g., refining the search results starting from a wide search spectrum of s single database to a narrower search spectrum.) Both inconveniences could result in a user time loss as well as increased user frustration, something that e-sellers of such products to the user wish to avoid because such user frustration could result in long term loss of sales revenues: impaired item search and comparison capability could mean more user (customers) take longer time to make e-purchases (slowing inventory turnover for sellers and decreasing profits) or worse frustrated users ultimately fail to complete the purchases at all.

What could be needed therefore is the present invention that could providing a large online single source retail item mega database that lists the item or product inventories of more than 75,000 retail merchants (combined inventory of over 25,000,000 items) further coupled with an expedited item vertical search capabilities specializing in item comparison that could allow faster more efficient customer purchase resolution than could be obtained from a wide spread horizontal search of multiple online individual retailer databases. The expedited vertical search and comparison capability could be further coupled to social media interaction means to generally allow the customer to interact with desired social media substantially simultaneously with the item searching to provide a customer retention means.

SUMMARY OF ONE EMBODIMENT OF THE INVENTION

Advantages of One or More Embodiments of the Present Invention

The various embodiments of the present invention may, but do not necessarily, achieve one or more of the following advantages:

to provide a web portal with a product search and purchase capability combined with a streaming or scrolling banner of an interactive, real-time presentation of user's personal social media information, text, email, news, stocks, directed advertisement and the like, the activation of interactive text as presented by the scrolling banner brings up another web page presenting greater detail on the activated interactive text;

the ability of a web portal to conduct a product item search on a webpage that further continuously streams personalized media data about the user in an interactive format that can redirect the user to a desired personal social media webpage;

provide a web portal with online product item research and procurement capability along with a simultaneous, real-time, user personalized social media presentation and access;

the ability of an online product research and purchasing web portal to present a scrolling tickertape display of real time information from various information sources as selected by the individual web portal user;

provide an online product research and purchasing web portal having access to its own merchandize database of a multitude of merchants, the web portal also providing a scrolling tickertape display showing information from a web portal user's account from one or more social media websites;

the ability of an online product research and purchasing web portal to associated a user-seller based interactive bid function for the purchase of a product item with a bid compilation formulation and resulting display that provides the participating seller or merchant (providing the product item being bid upon) with information to select that user's bid amount that would be the most advantageous (i.e., profit wise) to seller/merchant upon which to close the bidding;

provide an online product research and purchasing web portal having access to its own merchandize database of a multitude of merchants, the web portal also providing a scrolling tickertape display upon the web portals homepage showing information and from one or more news or information sources that are selected by the user, the information and news being presented in a scrolling tickertape display;

the ability of an online product research and purchasing web portal to provide the web portal user with a product item price watch function that sends an alert to the user based upon the product item price meeting a price as set by the user;

provide an online product research and purchasing web portal having access to its own merchandise database comprised of a multitude of merchants, the web portal also providing a scrolling tickertape display showing emails and texts addressed to the respective web portal user; and the ability of an online product research and purchasing web portal to provide the web portal user with directed advertising, the directed advertising being presented to the user upon the home page of the web portal in a scrolling tickertape display along with other information that the user has directed to be displayed upon the tickertape display.

These and other advantages may be realized by reference to the remaining portions of the specification, claims, and abstract.

BRIEF DESCRIPTION OF ONE EMBODIMENT OF THE PRESENT INVENTION

One possible embodiment of the invention could be a method of accepting a bid for purchasing an item offered for sale through an internet web portal comprising the following steps: listing for bid with an internet web portal bid program of an item being sold by a merchant, the merchant being previously registered with the internet web portal; accessing the internet web portal bid program by a user to obtain of information for the bid item, the user being previously registered with the internet web portal; placing with the internet web portal bid program by the registered user of a bid for the item, the bid containing a price that the registered user will pay for the bid item; accessing the internet web portal bid program by the registered merchant to obtain bid information on one or more bids for the bid item as placed by registered user and any other biding registered users; presenting by the internet web portal bid program to the registered merchant of one or more economic factors other than the bid price to assist the registered merchant in accepting at least one bid from the one or more bids for the bid item, and processing as a sale by the registered merchant of at least one bid from the one or more bids for the bid item.

Another possible invention could be a method of accepting a bid for purchasing an item for sale through an internet web portal comprising the following steps: listing for bid with an internet web portal bid program by an item being sold by merchant; placing a bid for the item with the internet web portal bid program by the user, the bid containing a price that the user will pay for the item; accessing the internet web portal bid program by the merchant to obtain bid information on one or more bids for the bid item as placed by the user and any other bidding user; presenting by the internet web portal bid program to the merchant of one or more economic factors other than bid price to assist as those factors relate to a particular bid for the item; changing at least one value of the one or more economic factors by changing the value of a bid amount that the merchant will be willing to accept as a winning bid; and processing by the merchant of at least one winning bid from the one or more bids for the bid item as a sale.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that could be described below and could form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

FIG. 18B substantially shows a screen capture of a screen of Special Offers side column with narrowed search results of the web portal of the present invention.

FIG. 31 substantially shows a screen capture of login/log on second screen for the web portal of the present invention.

DESCRIPTION OF CERTAIN EMBODIMENTS OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

The present invention could comprise web-based search and bidding system with the system capable of directly accessing to a retail item mega database comprising of combined inventories of over 75,000 online retail merchants (e.g., providing information and procurement access to over 25,000,000 items) and a method of operating same 200. The present invention's search engine in accessing this retail merchant mega database could be seen as offering the user a vertical penetration search ability that could lead to quicker and faster user decisions on point of sale purchases. Such decisions are substantially desirable by both the participating user and the retail merchants whose inventories represented in the database.

Figure 1:
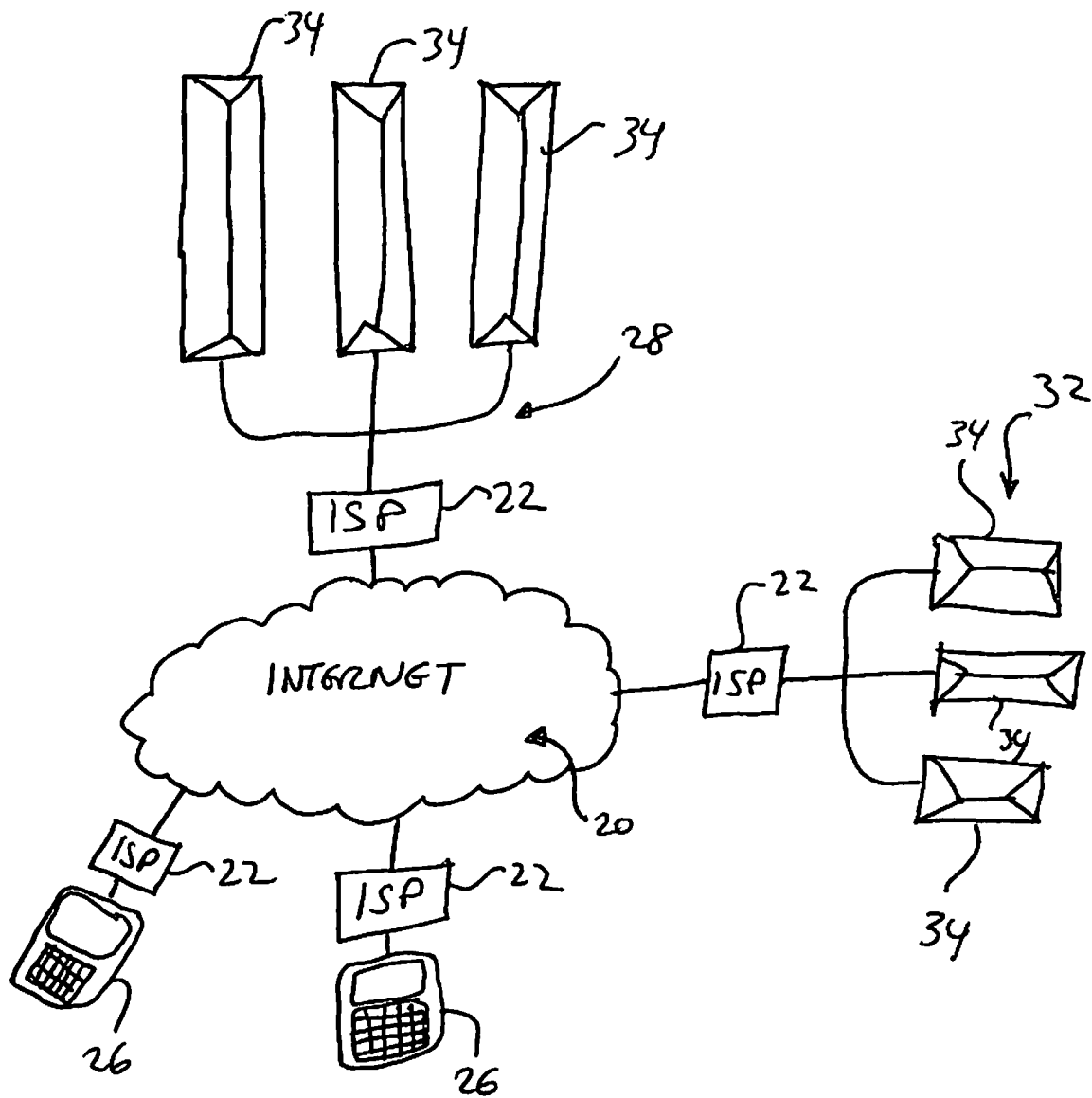
FIG. 1 substantially shows typical hardware architecture for the present invention.
Figure 14:
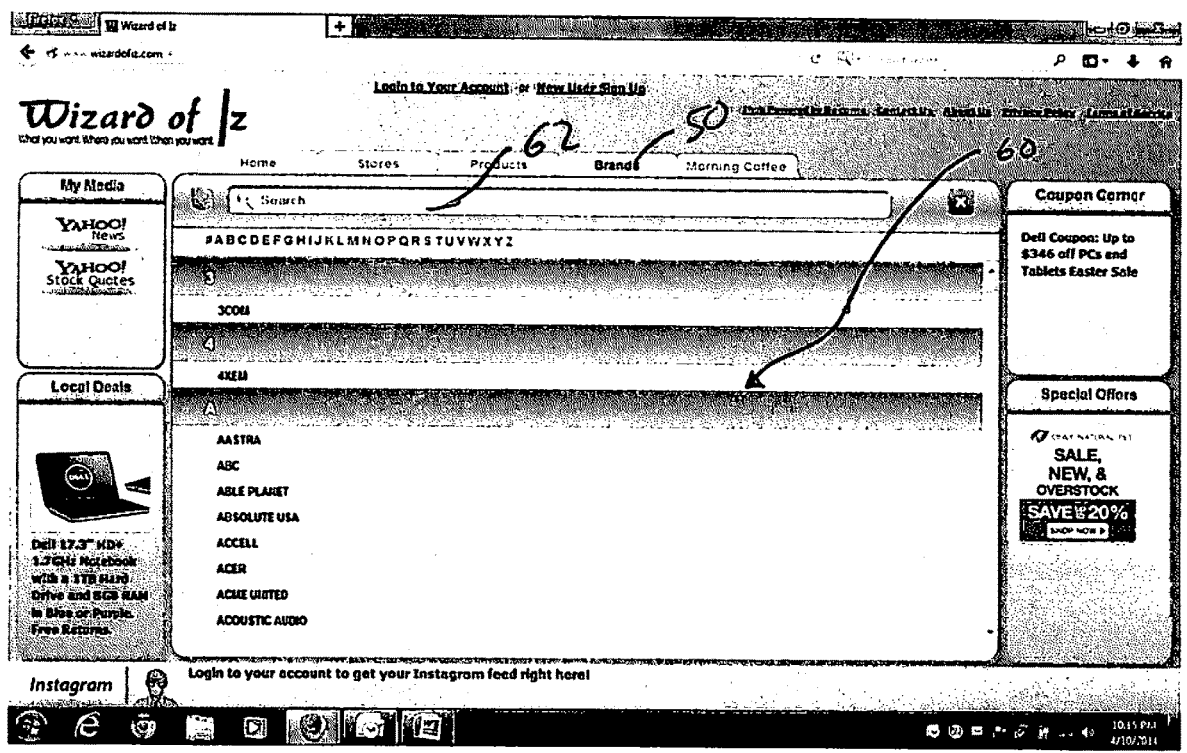
FIG. 14 substantially shows a screen capture of a screen of a database search the search is limited to brands category of the web portal of the present invention.
Figure 14A:
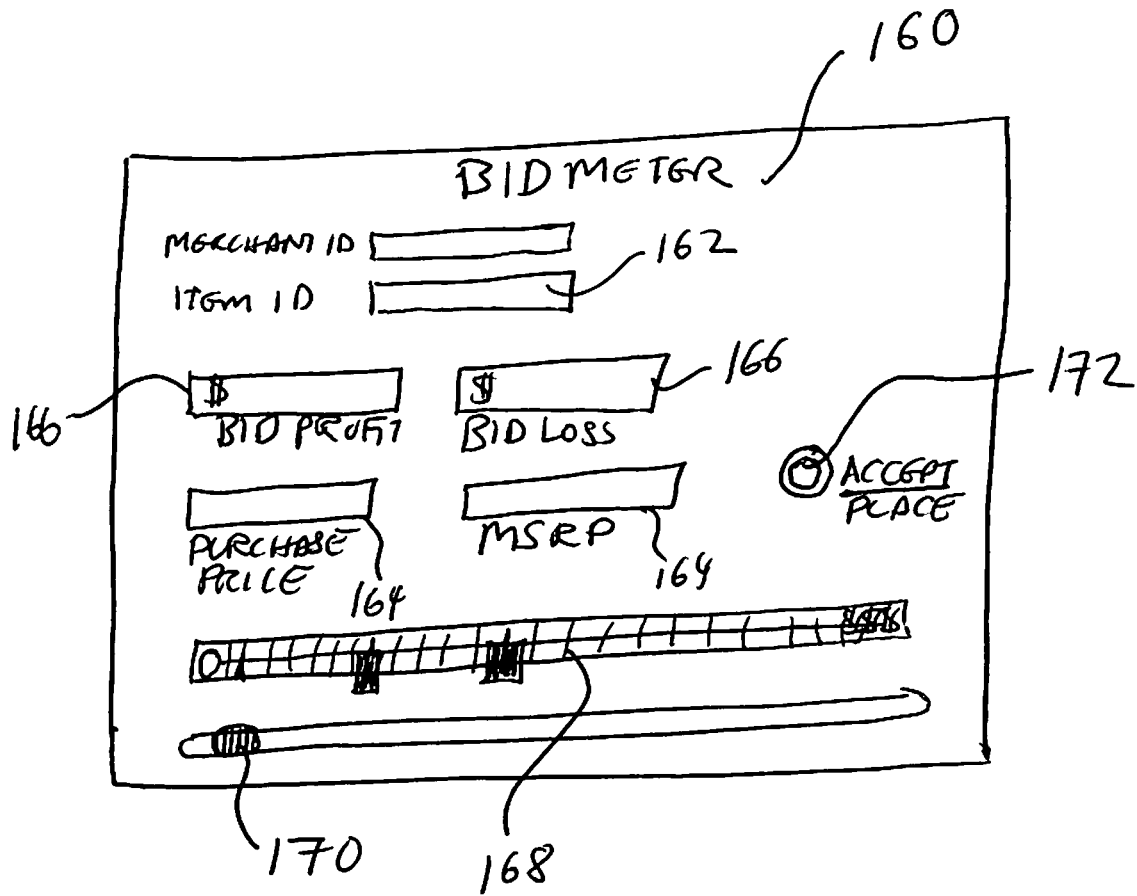
FIG. 14A substantially shows a screen capture of a screen of a bid meter screen of the present invention.
Figure 14B:
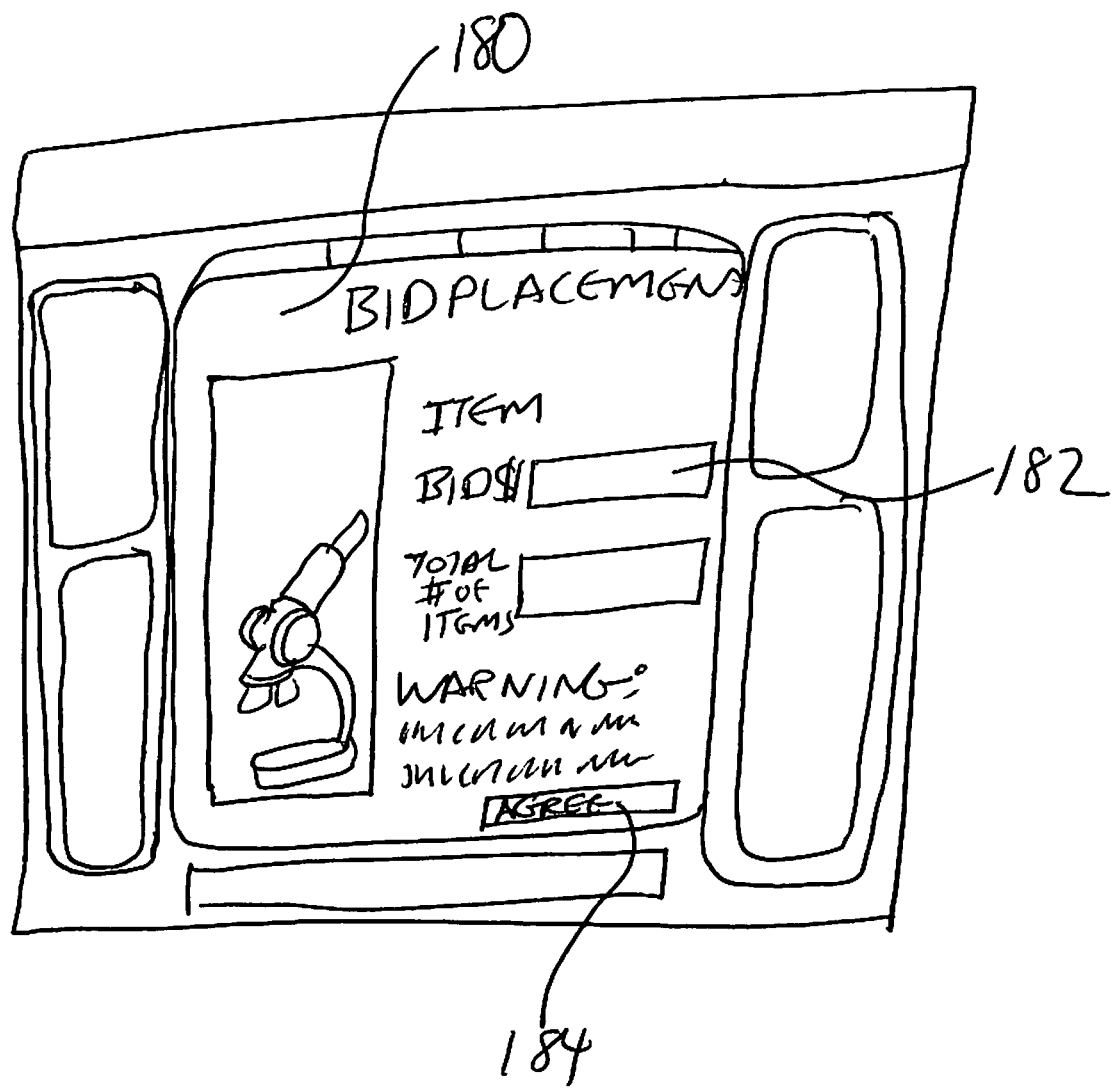
FIG. 14B substantially shows a screen capture of a screen of a bid placement screen of the present invention.
Figure 14C:
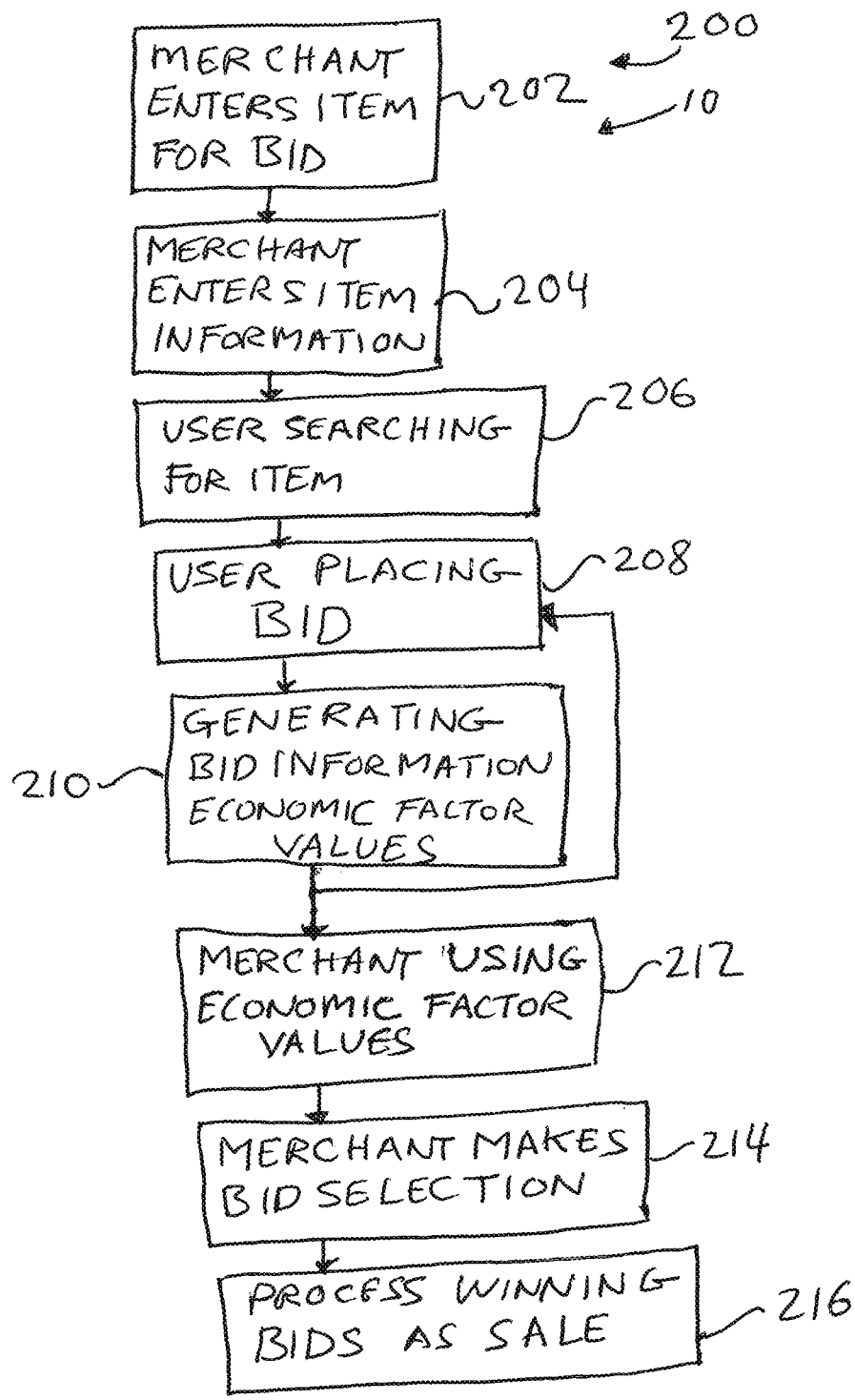
FIG. 14C substantially shows a flow chart for one possible embodiment of the bidding process for the present invention.

As substantially shown in FIG. 1, the invention 10 (as generally shown in FIG. 14C) generally operates through a network of networks running a comprise multitudes of servers found through the world and hosting the WWW service as better known as the internet 20. An internet service provider (e.g., ISP) 22 could provide the gateway or conduit for a user engaging those services to gain access to the data through the present inventions (e.g., a telecommunication means: satellite network system, cable network systems, telephone systems, and alike.) The user could have a suitable computing capability 26 (e.g., a computer with human interface and suitable processing abilities as well as memory capacity for storing data, programs and running programs that can process data and store process data results such a lap top computer, desk top computer, smart phone, hand-held computer pads and phones [e.g., Ipad®; Iphone®] and other such smart devices) that directly links to the telecommunications means. The user's computing capability 26 should have an internet search program to allow access to the internet and www to reach the invention's web portal (website) wherein the invention's search function program can access the mega-combined merchant inventories database. In at least one embodiment of the invention 10, at least one merchant whose inventory is listed in the mega database could similarly have another computing capability 26 separate from that of the seller's computing capability 26 that should have an internet search program to allow access to the internet and www to reach the inventions portal (website) 28 wherein merchant can interact with the invention's internet web portal 20 regarding a user's bid placed on an item being sold by the merchant through the invention's web portal.

The inventions search and bidding internet web portal 28 that can access and search a mega database can comprise of one or more servers 34 that connects to an internet service provider 22 to gain access to the internet 20. These servers 34 can host various programs such as a search engine program, bid programs and other programs and associated databases. Similarly, the web portal for accessing mega database can also comprise of one or more servers 34 connected to an internet service provider 22. These servers 34 can host programs for managing and accessing the mega database 32.

Figure 1A:
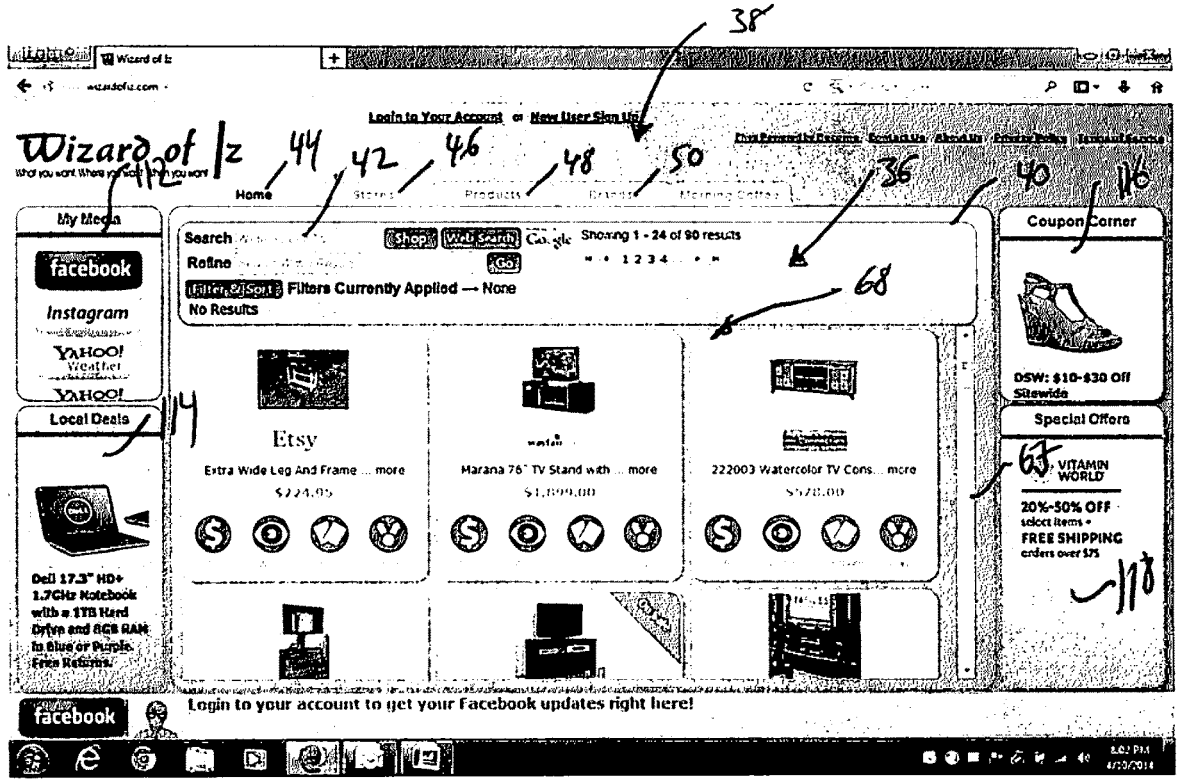
FIG. 1A substantially shows a screen capture of the front or home page of the web portal of the present invention.

The vertical searching process of items offered for sale though the invention's web portal 28 could be started using the interactive main search bar 36 presented on the front or home page 38 of the invention's web portal as substantially shown in FIG. 1A. The main search bar 36 is generally visually presented as border-delineated search tool bar 40 on the first or front webpage 38 of the invention's web portal. Within the search tool bar border is search text entry window 42 (labeled "Search") and several other interactive search functionalities that could work in conjunction with search text entry window 42 to allow the user (not shown- and generally seen as the "online user" rather than the "web operator" running the website and search functionalities or the merchant that is offering items for sale by the inventions web portal) to rapidly obtain desired item search results with associated applicable item information and then provide the user with additional subsequent search refinement tools to further allow the user to refine and narrow the initially returned search result information in a vertical search manner rather than a horizontal search manner.

Graphically, the search text entry window could accept entry of text by a user through the user's interface (generally shown in FIG. 1.) The user could enter terms, symbols or the alike into the search text window to initiate the search for desired items for sale (using a enter key to have the system act upon the entered term[s]). Generally located at the top of the search tool bar one or more labeled interactive search parameter keys or buttons controlling several default levels through which the search tool bar could operate. In one embodiment, the search parameter keys or buttons could have the individual labels of Home 44, Stores 46, Product 48, Brand 50 and the like. The Home button 44 activation sets the search tool bar's initial search at it the broadest search parameters for the search and is also the default search parameters. The Stores, Product or Brand tabs or keys 44, 46, 48 could alternately function to further narrow or restrict the search scope or parameters on the search tool bar's initial search by limiting the returning initial search results to various narrowing categories of stores, product type or product brand names. In one possible embodiment not shown, activation of an additional key could be used to redirect the user from the home page to non-search functionalities located on other web pages of the invention's website such an online chat board or like for possible discussion topics related to the product being searched.

Figure 12:
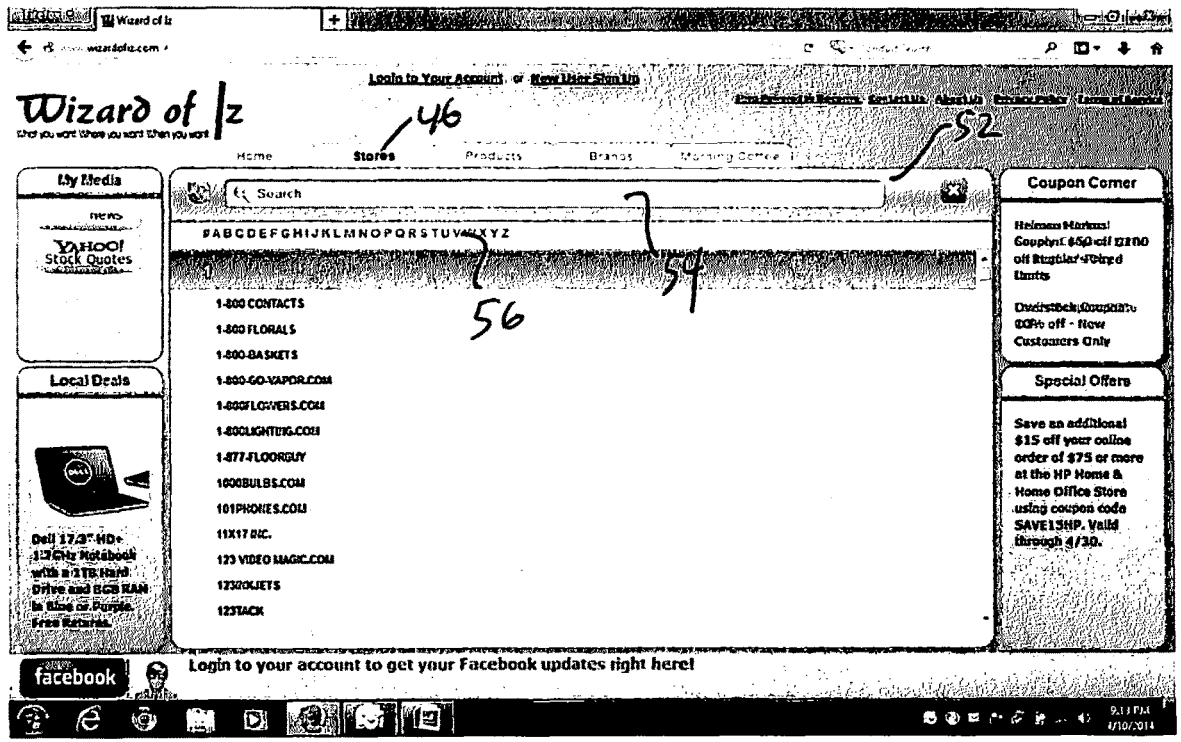
FIG. 12 substantially shows a screen capture of a screen of a database search when the search is limited to stores category of the web portal of the present invention.

As substantially shown in FIG. 12, after clicking upon to activate the Stores key (button or tab), a stores search window 52 generally opens to display a stores text window that allows the user to enter the name of a store or store chain that the user interested in searching their merchandise. If that store sought is a Merchant partner of the web portal (e.g., a merchant whose merchandize inventory is part of the mega database, then resulting search returns could display the Merchant partner's store in the search return. Upon entering the desired store name, the web portal could return the user to the home page with all of the merchandise inventory from that store segregated for searching by the home page search function for further selected product item searching by the user.

Alternatively, the user can click upon a letter of a horizontal alphabet listing 56 located below the stores search window 52 to display all of web portal's partnered merchant's stores whose names begin with that letter could be displayed in the search results. The user then picks the desired store name (e.g., an interactive listing) from the store name search results to have the web portal segregate that stores merchandise inventory for the home search and the user is redirected back to the home page for product item search on that specific inventory.

Figure 13:
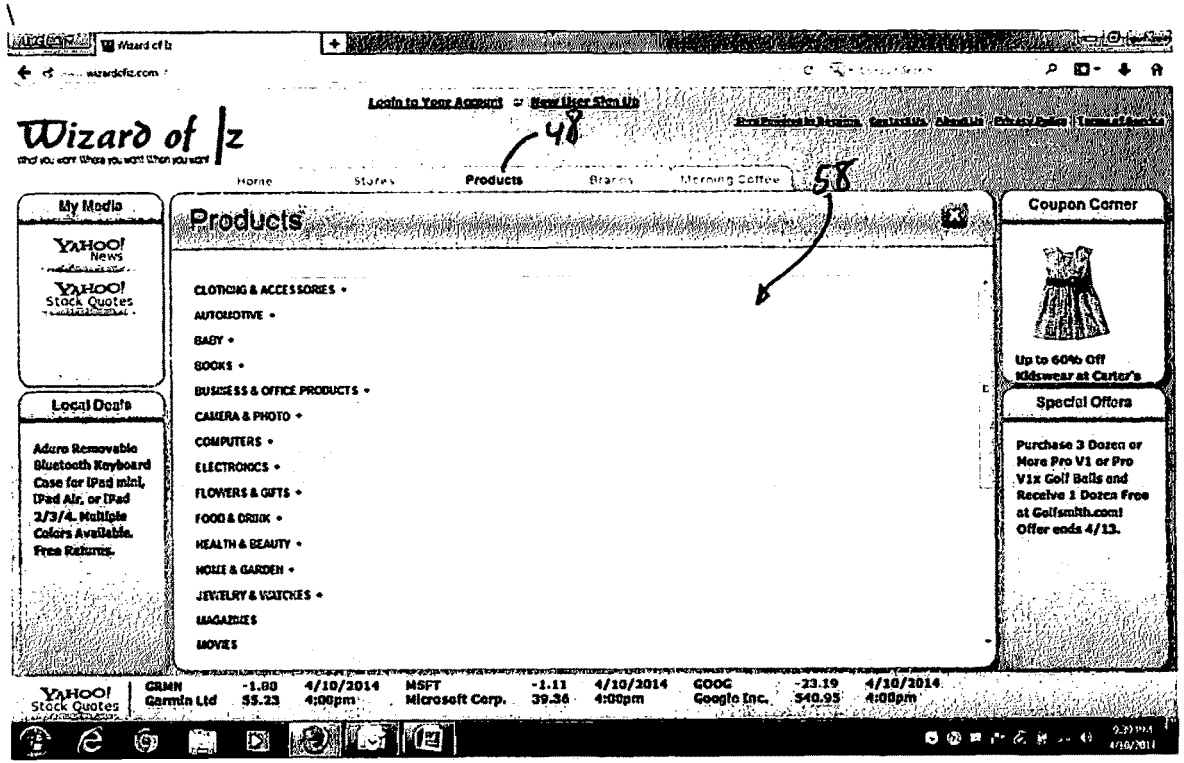
FIG. 13 substantially shows a screen capture of a screen of a database search the search is limited to products category of the web portal of the present invention.

As substantially shown in FIG. 13, the user activates the Product tab or key 50 to display a dropdown products menu screen 58 that overlays the home or front page. The screen 58 presents a vertical list of product item categories in alphabetical order (e.g., dolls, power tools, etc.) to find that particular product. When the particular product type is selected by the user, the dropdown screen rolls up and out of the way to bring the user back to the home page where all of the products from all of our partnered Merchants for that particular product type could be displayed on the Home Page. The user can then further engage the Main Search Bar to search through the displayed products to find the desired product item.

As substantially shown in FIG. 14, the user by engaging the interactive Brand button or tab 50 to cause the Brand search screen 60 to overlay the front or home page. The Brand screen 60 provides in a similar manner as the Store functionality as the Store button with the ability to search for the desired favorite brand by either typing in a word or like in the Brands text box 62 or by clicking on the letter in the alpha-numeric listing below the search window that represents the first letter of the product brand sought. After the user selects the appropriate letter (or types in the brand search word in the text box), the search could present a search result of all of the brands that begin with the letter selected/related to the typed in word. The user clicking on the desired brand in the search results could cancel the brands overlaying search screen to return the user to the home page to display that the selected product items of that Brand from all of our partnered merchants. The user can then further engage the Main Search Bar to search down through the displayed brand products to find the desired product item.

Figure 2:
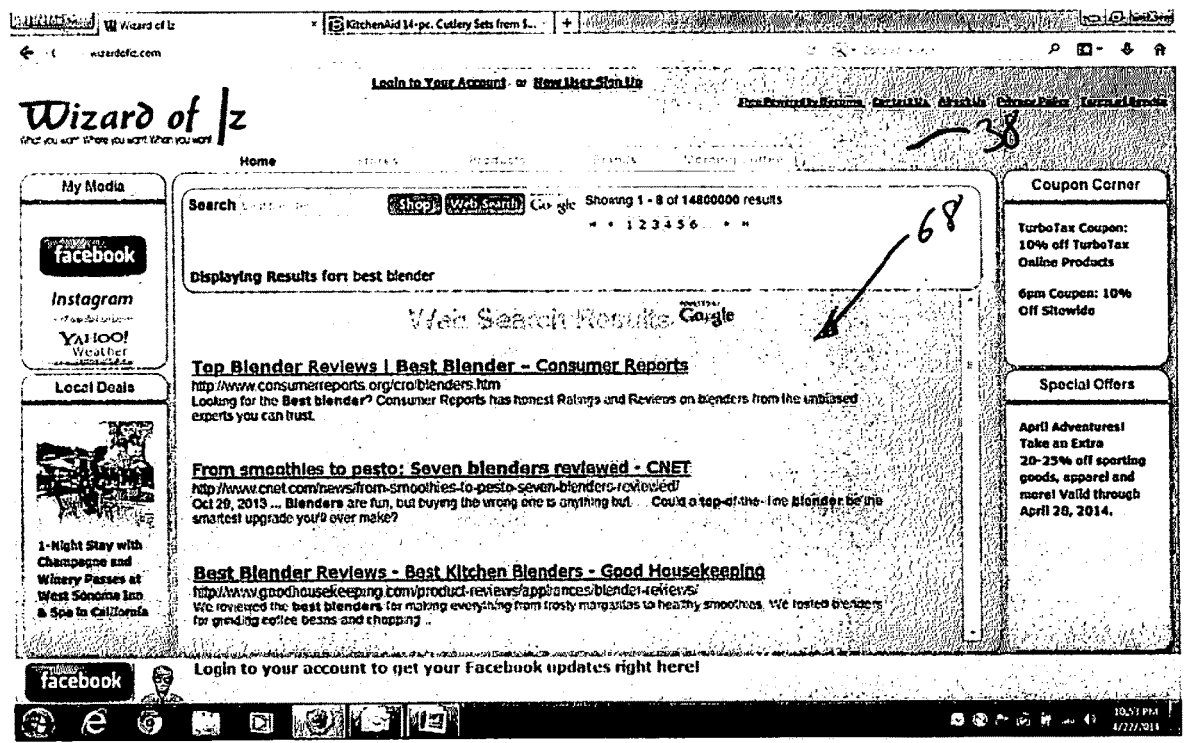
FIG. 2 is substantially shows a screen capture of a screen of internet-based search results of the web portal of the present invention.

As substantially shown in FIG. 1, the proximate to the search text entry window 42 could be located "Shop" and "Web Search" labeled interactive buttons 64, 66. The "Shop" button 64 when activated (or clicked upon) could compare the terms or symbols entered into the search text entry window 42 with the mega database and display the item or product search results in the Search Results Display Window 68 located below the search text entry window 42, the displayed search results generally correlate to the inputted terms or symbols. Similarly, the "Web Search" button 66 when activated or clicked instead of searching the mega database could otherwise access and openly search through the World Wide Web (i.e., www) with the terms or symbols imputed through the search text entry window 42. As substantially shown in FIG. 2, the web product search result so compiled, like the megadatabase search results, could be displayed below the text window in Search Results Display Window 68 Window being shown in a list-type format often used by various web search engines (e.g., Google®, Bing® and the like).

Figure 3:
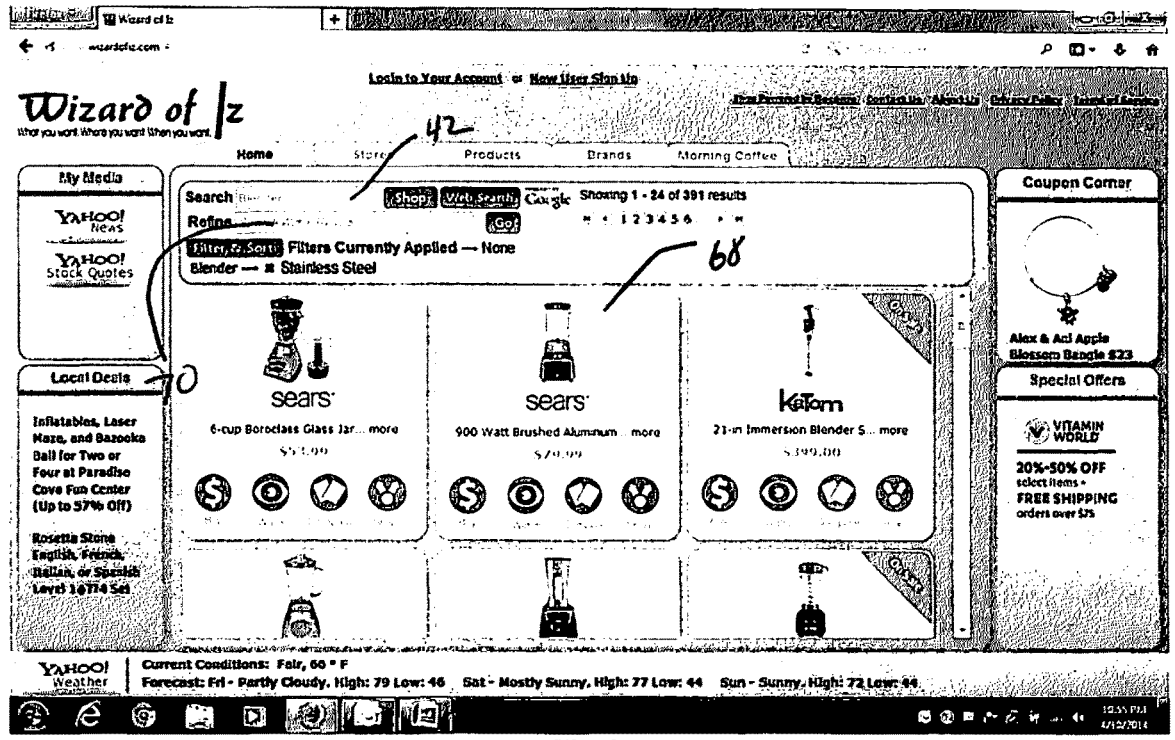
FIG. 3 is substantially shows a screen capture of a screen of database search results using the refine functionality of the web portal of the present invention.

As substantially shown in FIG. 3, between the search text entry window 42 and the Search Results Display Window 68 could be further located the Refine Search text window 70 into which additional or secondary search terms, symbols or alike can be entered to further restrict or narrow the search text entry window's original product search results. The "GO" Button next to the Refine Search text window 70 could be clicked or otherwise used to activate the narrowing or refining of returned initial search results or the search itself once the text, symbols or alike have been entered into Refine Search text window 70.

Figure 4:
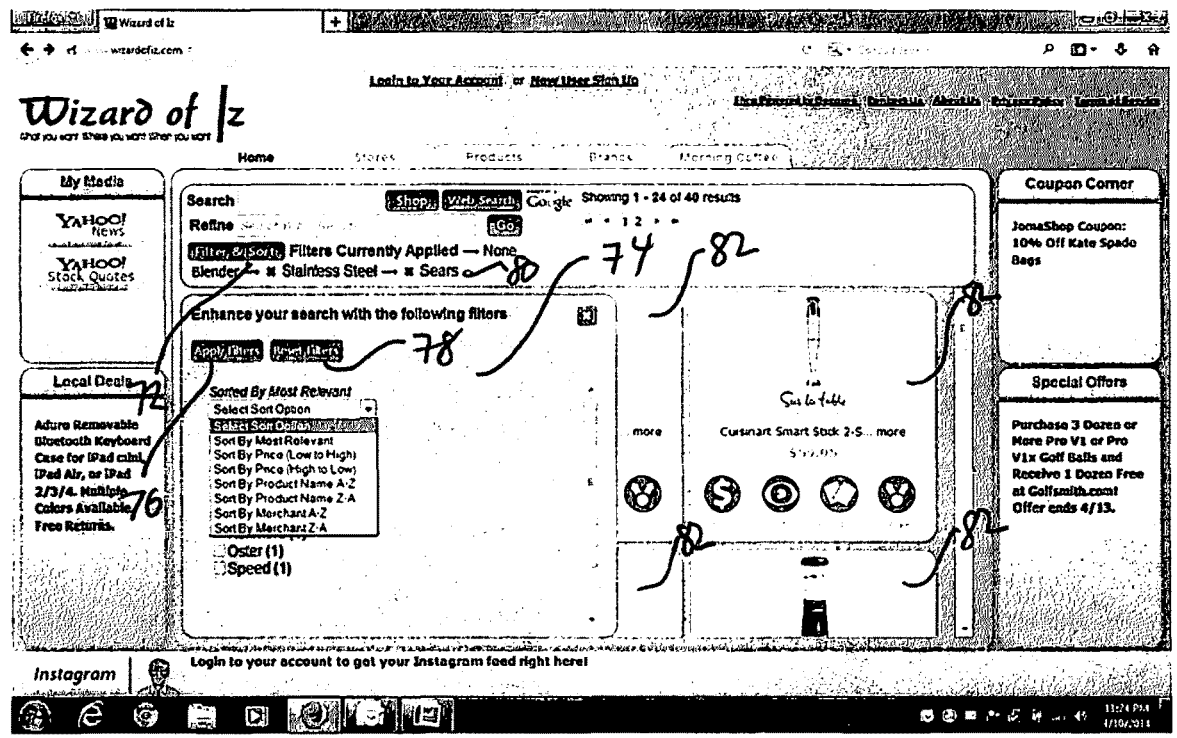
FIG. 4 substantially shows a screen capture of a screen of a database search using the filters & sort functionality of the web portal of the present invention.

As substantially shown in FIG. 4, located below the refine search text window text are the interactive Filter & Sort button 72. This interactive functionality upon suitable activation could cause the appearance of a Filter & Sort dropdown screen 74 that presents a set of pre-existing search organizational parameters (to sort or otherwise prioritize the presentment of any products search results obtained from the search tool bar) Apply Filters button 76, and Reset Filters button 78. The filters organizational parameters presented could include: "sort by relevance", "item price-most expensive to least expensive"; "item price-least expensive to most expensive"; "item name A-Z; item name Z-A"; "merchant name A-Z"; "merchant name z-A" and the like. The user could select and activate (click upon) the listed desired parameter from the dropdown screen and then activate the "Apply Filters" button 76 to apply that parameter to the displayed search results to organize the presentment of the displayed search result accordingly. If that parameter is no longer desired or a new parameter is desired, the "Reset Filters" button 78 can be activated to delete the selected parameter and/or allow the user to select a new organizational parameter. When a selected parameter is applied to the product search results, the selected organizational parameter identification could be shown to the right of the Reset Filters button.

Below Filter & Sort drop down window could be located a search terms breadcrumbs trail window 80 which could show in outline fashion the original search terms and subsequently entered search refinement terms enlisted to refine or narrow the product search or its returns. An interactive "X" symbol placed in the breadcrumbs trial window 80 prior to each of the additional search refinement terms could be clicked upon to eliminate a respective additional search terms from the search to further modify or refine the search as desired by the user. The bread crumb trail window 80 could further show the search terms as modified as such.

The search return or search results of the internet search, the mega database search and alike can be displayed below main search bar. The "showing . . . results" visual display, which could show the number of items referenced in the results. The "showing . . . results" display located to the right of the search text window could display the number of items found and number of display pages of items found. The "showing . . . results" display could be interactive to allow the user to select the number of an individual display page to bring up and display upon search results or return display window.

Once a product search (mega database only) results have been compiled and displayed via search results display window, each product item so displayed can be shown in a respective individualized item frame 82 containing the item's written identification along with a posted picture or graphic representation of the item, an abridged description of the displayed item and a set of Buy, Watch, Share and Compare interactive buttons 84, 86, 88, 90.

Figure 5:
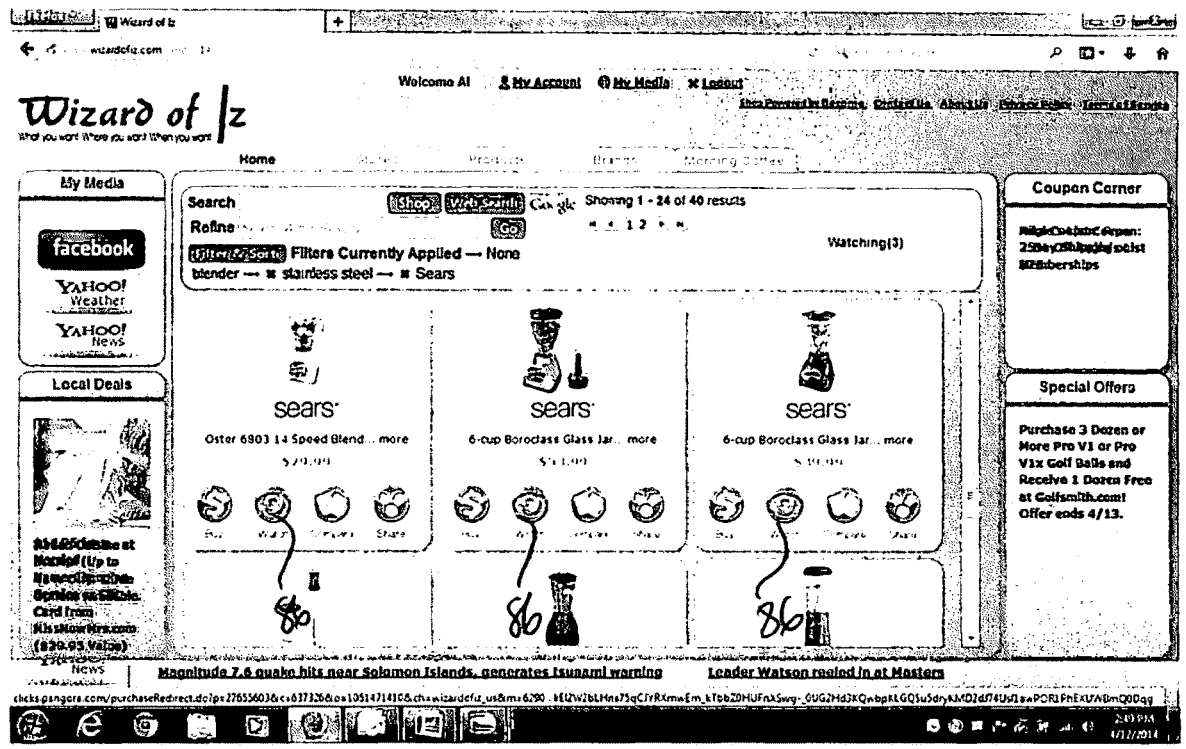
FIG. 5 substantially shows a screen capture of a screen of a database search using the watch functionality of the web portal of the present invention.

The prior to the user's activation of the interactive "Watch" button could first require the user to initially registration with the invention's web portal with basic user contact information so that the user's contact information can be subsequently stored in an encrypted database of the web portal. As substantially shown in FIG. 5, upon subsequent sign-in or sign-on by the user (e.g. registered with the portal to access certain functionalities of the web portal) to the web portal, the user's previously stored and protected contact information may then be accessed by the invention's servers (providing the web portal) to further allow the invention (e.g., web portal) to identify the user as being previously registered with the web portal. This identification of the user allow the user to access and activate of (e.g., "clicking on") the Watch button 86 enables the user though the Watch functionality to have the invention send the user to get a telecommunication message alert (e.g., e-mail or text message or both-not shown) as issued by the invention's web portal using user's previously entered and stored telecommunication's identity. This watch alert message is sent out whenever, the price of the selected product item as displayed in the search result and subsequently being "watched" by the web portal changes (e.g., the merchant offering the watched product item, changes [e.g., reduces] the price of the product item.) Additionally, the Watch functionality may further allow the user to set a price cutoff limit or value so that the electronic alert is only issued by the system if the watched product items price meets or goes lower than the user's price cutoff limit or value the prices of the all the products user are interested in on a single page.

Figure 6:
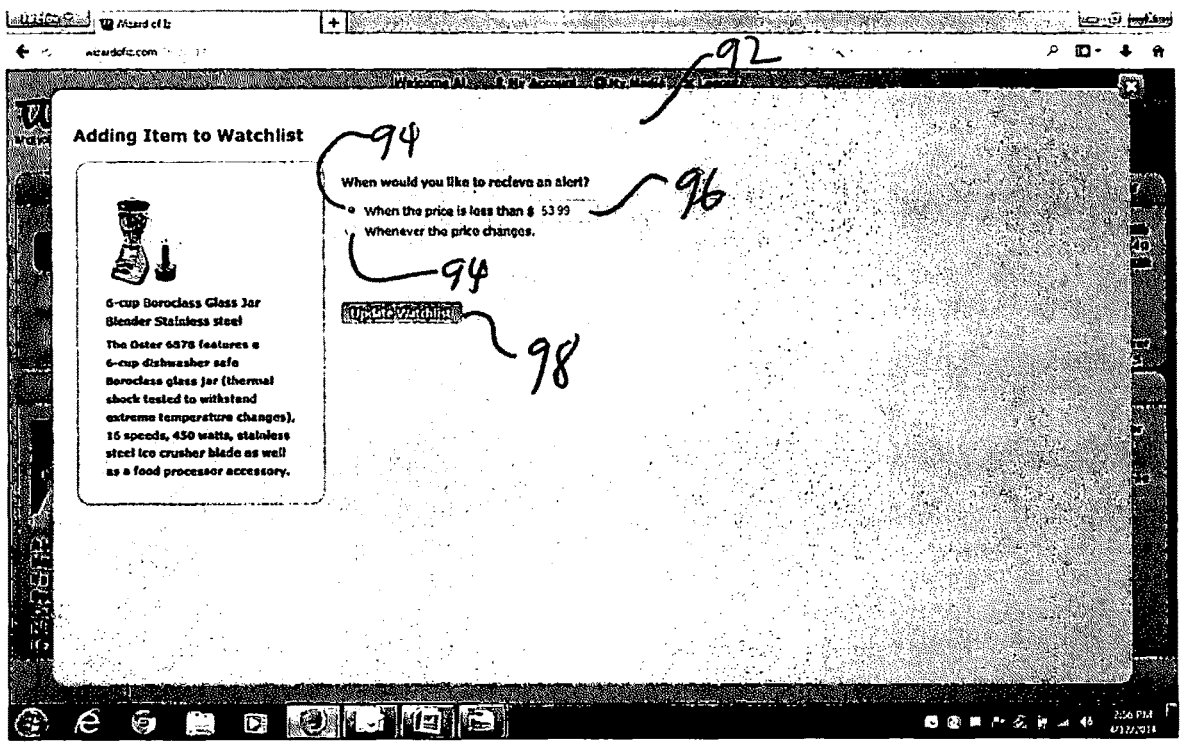
FIG. 6 substantially shows a screen capture of a screen of a database search using the watch functionality overlay display for setting the user's price of the web portal of the present invention.

When the user activates the Watch button 86, the color of the Watch button 86 may change colors (e.g., from black to orange) to identify and reminder to the user to which product items are being watched. Once Watch button 86 is so activated, a Watch drop down screen 92 may substantially overlay the front page, as substantially shown in FIG. 6. The Watch drop down screen may present a set of interactive Watch radio buttons to allow the user to choose only one of a predefined set of options: namely one radio button upon activation that generally allows the user to set the price alert for the Watched selected product item according to any change in the price; and a second alternative radio button also allows the user to set a price alert got the Watched selected product item. The second alternative radio button further has an associated monetary value text field next to it. The user's activation of second radio button allows the user to input into the Watch monetary value text screen 96 a price value as desired by the user for the Watched selected product item. Upon activation of a third Update Watched List labeled button 98, the user's selection of buttons A or B (and users' set price value for the watched item as appropriate) is imputed in the watch list system for the product items being watched by the web portal for the user.

Figure 6A:
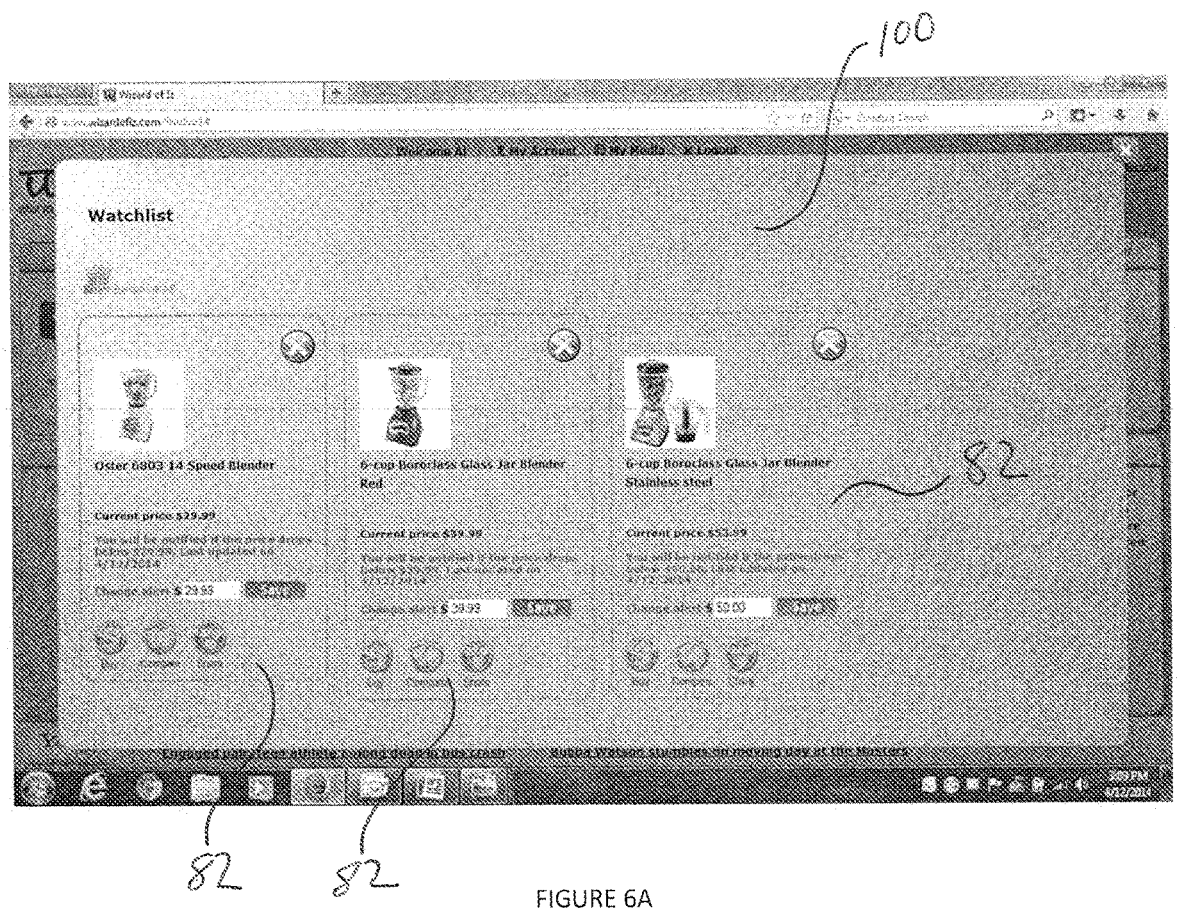
FIG. 6A substantially shows a screen capture of a screen of a database search using the watch functionality overlay display showing all the items being watched of the web portal of the present invention.

As substantially shown in FIG. 6A, a Watch List screen 100 is subsequently generated as a front page overlay page once all the second Watch screens for the watched items have been completed. The Watch List screen 100 is generally populated generally with copies of the watched product items' individualized frame 82. These frames 82 respectively display information such as when watch began; when the watch was last updated and the product item's current price. If a set price value drop option was employed, the monetary value text field displays the previously set user price. If the user so desires can enter new value data into the monetary value text field to change the user's set price.

Upon User's activation of Watch Save button 102 next to the field the user's updated set price is set within the watch list database.

Each individualized item frames 82 of the watched items also have the interactive buttons (e.g., buy, share, compare, etc.) of the non-watched item frames with the exception of the Watch buttons have been replaced by a respective interactive Discard button (displaying an "X"-not shown). The Discard button upon user activation allows the user to remove or discard a respective selected product item from the watch list. In this manner, the user may then engage the Buy, Compare, Share button functionalities as shown on the item display from the Watch list page. Upon setup of the watch list page an interactive Small "x" button may be active to close out the watch list screen.

After a preset price notification is triggered through the Watch functionality, system could issue a telecommunications electronic notification to the user telecommunication device; the watch list could be updated so that when User accesses the Watch List page, the notified watched product listing could further display the date and time of the User's telecommunication notification on the Watch list Page. Further, the Home or Front Page could display an "Alerts" notification bar (indicating that the system has issued telecommunication alert to the User) in addition to displaying the number of watched product items on the right side of the Search Bar.

Figure 7:
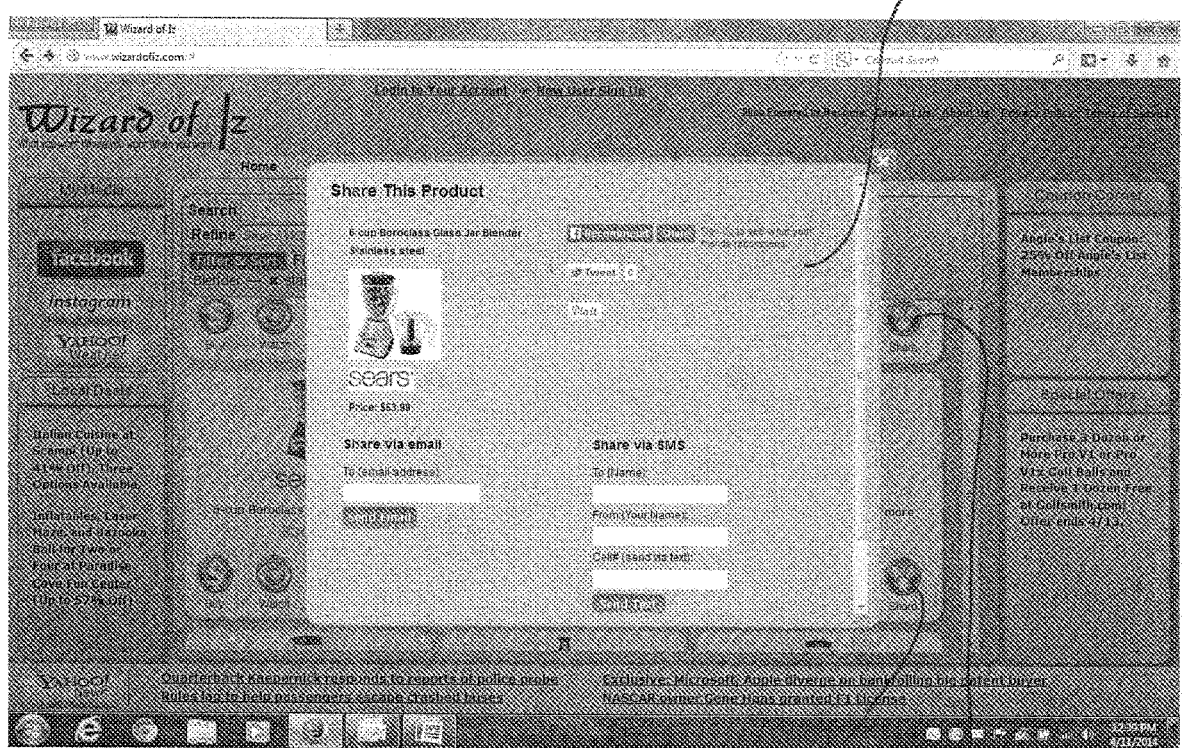
FIG. 7 substantially shows a screen capture of a screen of a database search using the share functionality of the web portal of the present invention.

The "Share" button functionality on a respective product item return frame generally enables the user to transmit product item information to others via electronic message service (e.g., email or text message.) This functionality further allows the user to access their email contacts database for email purposes as well as entering multiple phone numbers for text messaging purposes. As substantially shown in FIG. 7, upon activation, the "Share" button brings up a separate Share display page 104 overlaying the front or home page that shows information and images of the selected product item. This Share display page further visually supports two electronic message service options (e.g., email on the left side and text on the right side.) This option has text windows for entering email addresses or phone numbers. The activation of this Share functionality web portal could activate user email software platform (not shown) on the user's electronic device (e.g., user's computer) that the user is using to access the invention's web portal. This activation of the user's email software platform could display and populate on the user's electronic device an email form in that email platform with the user's email address identifying user as the sender of the email and with basic information from the search regarding the selected product item. In this manner, the user can add additional comments to the body of the email or send the email to parties as generated by the web portal to selected third parties.

Additionally or alternatively, a text message can be generated and issued by the system after activating the appropriate interactive Send Message button (e.g., after inputting the user name, the recipient's name and recipient's phone number in the appropriate text message text fields, to send out a SMS or text message to another's phone or other smart device.) After clicking the Send Message button, the Share display page could display and interactive "Share Again" button that user could activate to bring up blank text screens to input another recipient's cell phone number and name. Clicking the Send Message button may then cause the creation and sending of the new SMS message to the designated additional recipient. This aspect of the Share functionality could allow text messages to be repeatedly sent out to desired third parties about a selected product item.

Figure 8:
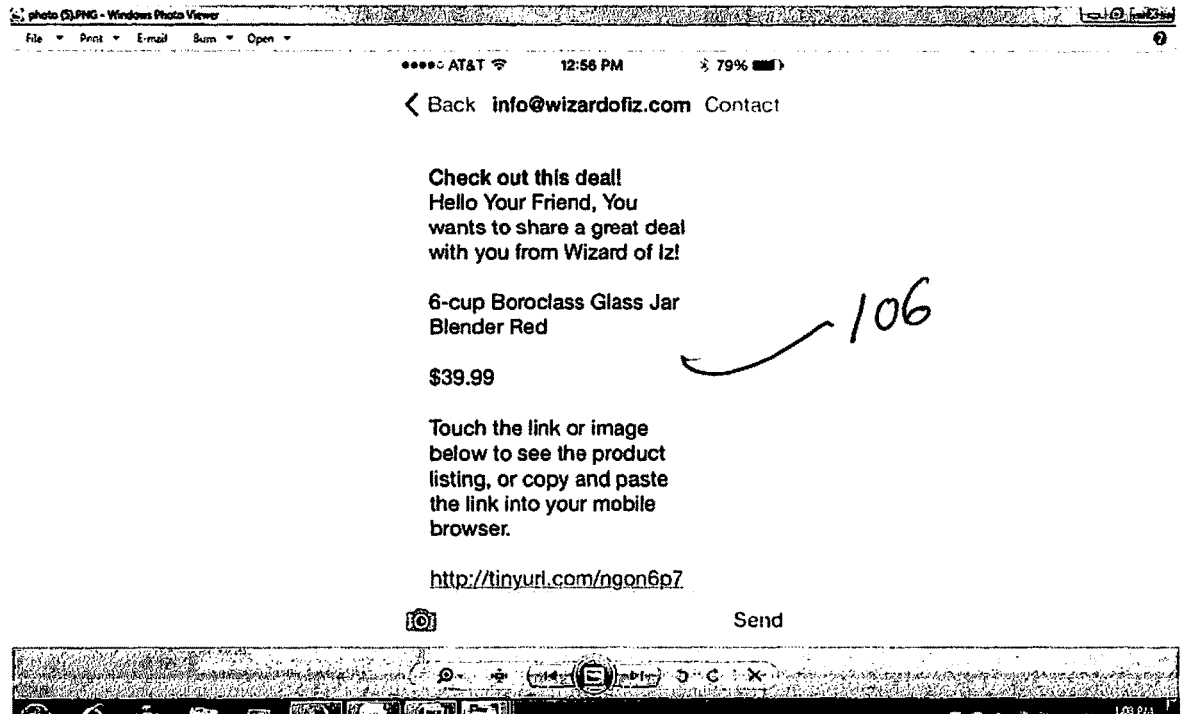
FIG. 8 substantially shows a screen capture of a screen of the received text message as sent using the share functionality of the web portal of the present invention.
Figure 9:
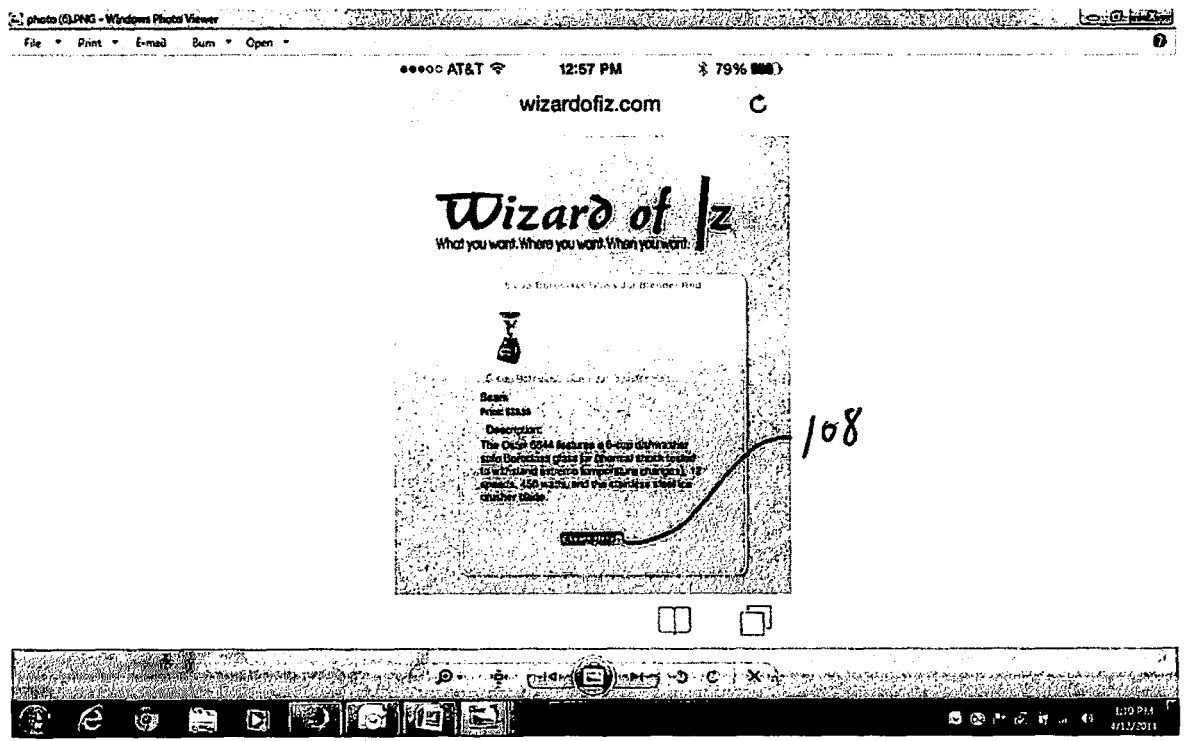
FIG. 9 substantially shows a screen capture of a screen of resulting page from clicking the link on the text message issued by the web portal of the present invention.

As substantially show in FIG. 8, the received text message 106 as received by the desired third party could display product item information and price upon the third party's electronic device (e.g., computer, telecommunication's device.) A URL link displayed in the message could be used to direct the recipient's smart device to a webpage at the invention's web portal displaying additional pictures and information of the selected product item as well as an interactive "Learn More" button. As substantially shown in FIG. 9, activating the "Learn More" button, or interactive product titles or picture could further redirect the recipient's electronic device to a webpage of a Merchant's website feature more detailed information about the selected product item.

Figure 10:
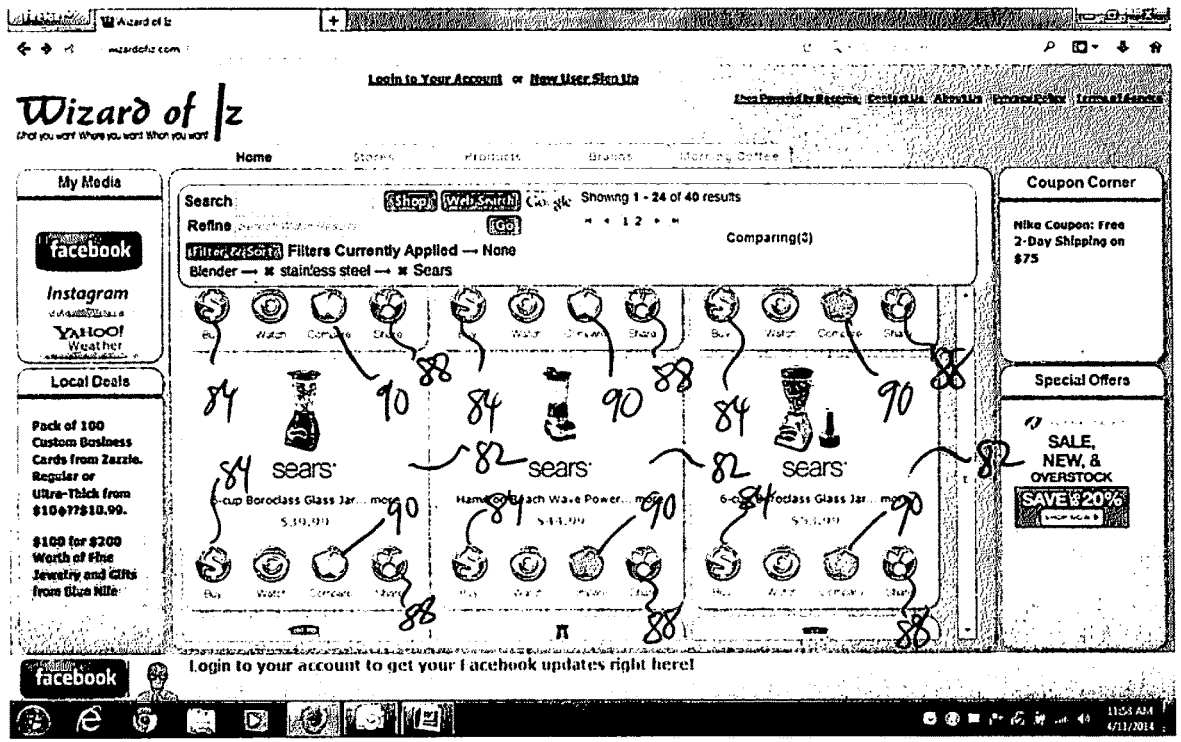
FIG. 10 substantially shows a screen capture of a screen of a database search using the compare functionality of the web portal of the present invention.
Figure 11:
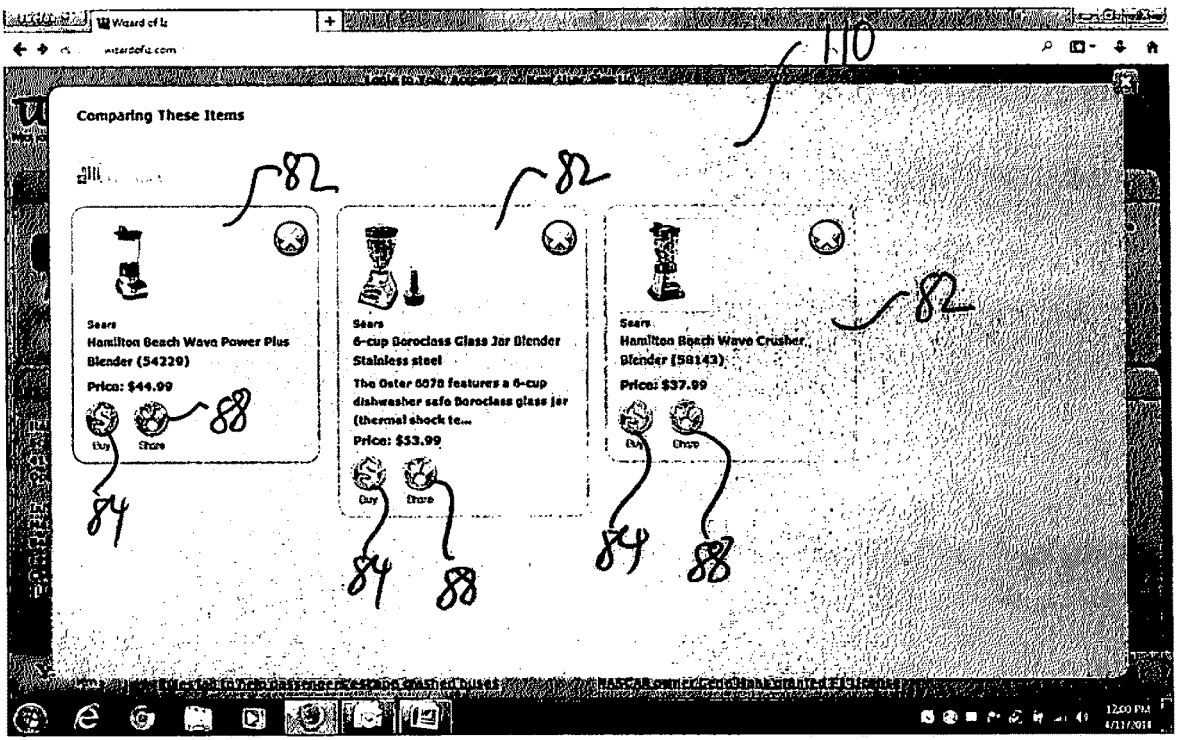
FIG. 11 substantially shows a screen capture of a second screen of the watch functionality of the web portal of the present invention.

As substantially shown in FIGS. 10 and 11, the activation of the Compare button (e.g., per selected product item) places the individual frames 82 of the selected items being designated by the user to be displayed upon a dropdown Compare screen 110 that substantially overlays the home or front page. Each of the individual selected item frames on the Compare screen 110 further display interactive Share and Buy buttons 88, 84 to allow the user to access those functionalities from the Compare screen 110 as well as Delete ("X") Button (that upon activation remove that product item individual frame 82 from the Compare screen.) A displayed interactive trashcan symbol button upon activation upon user activation can cause all the displayed selected product item individual frames 82 to be removed from the Compare screen. Each displayed product title on the individual frames 82 is interactive so that clicking on the title could redirect the user to a webpage of the website of the merchant featuring selected product item to obtain merchant provided detailed product description for the selected item. If after reading the detailed product description provided by the merchant for that item, the user wishes to eliminate selected item frame form the Compare screen 110, the user activates the appropriate Delete button to do so. An interactive small X button at the top of the Compare screen 110 can be used to close the Compare Screen 110 when the user is done with that functionality.

The inventions' "Buy" functionality is accessed by activating the interactive BUY button upon the individual item frame to generally redirect the user to the retail merchant website that is offering the selected product item for sale. Upon user's Buy button activation, the system opens a second page (not shown) on the internet browser (e.g., separate from the page displaying the system's home page or other webpages) that displays the Merchant's website showing the selected product item to allow the user to transact the actual purchase of the selected product item at the merchant's website. By clicking out of the merchant's webpage (upon the conclusion of the purchase transaction), the user will be redirected by the system to return to the home page of the invention's web portal.

In at least one embodiment as shown in FIGS. 14A, 14B and 14C, a participating merchant through its electronic device accessing the invention's the internet web portal to select one or more items from the merchant's inventory (e.g., that is available through the mega database) to a bidding process provided through the invention's web portal. This BID functionality or process may be initiated by the participating merchant using the merchant's electronic device and presented interface to access and sign into the invention's web portal. Once logged into the system, the participating merchant could access the merchant's item inventory database (as used by the web portal) to select one or more items (e.g., by the item's SKU) that could be subject to the bidding process. In one possible embodiment, the participating merchant could select items by for bidding based on various factors such a geography such zip code, city or state to possible act as an attractant to potential bidders living in those areas. As shown in FIG. 14A, in one possible embodiment, Merchant could access through the internet web portal a web bid meter page 160 for each item selected for biding. The bid meter page 160 could have a bid item identification text window 162 for accepting the bid item's SKU or other information for loading the item up for bid. Once the item identification information is entered, the invention's bid program could cross reference the mega database to pull up relevant item information for bidding of the item and populate static economic factors windows 164 affecting a selected bid's impact upon the merchant's profit or loss for the bid item. Alternatively, the merchant could manually enter into the bid meter page at appropriate respective text windows 164 the static economic information of factors regarding the bid item. The static economic factors could include such factors as the item's manufacturer's suggested retail price, merchant's actual purchase price of item, merchant's item sale price. The bid program could take a bid value and calculate the effects of static economic factors against to determine values to be displayed in merchant loss and profit displays 166. The merchant can set through the bid value window 168 at this time the minimal acceptable bid value (with the program further calculating and showing the merchant's loss and profits in the displays.) At this time (pre-bid process) an activation of accept button 184 on the bid meter page can enter that bid value in the bid program as the minimum bid value that the merchant will accept for the bid item. If a user during the bidding process submits a bid lower that value as set by the merchant, the bid program could reject the user's bid. In one embodiment such a minimum bid level is not disclosed to users bidding upon the item. In other embodiments, the minimum bid amount could disclosed through the system to users biding upon the bid item (e.g., after the winning bids have been accepted by the merchant.) The bid value display window 168 can show the bid value as entered by the merchant. In one possible embodiment, the participating merchant uses the sliding button 170 to adjust the numerical value shown on the bid value display window to threshold or minimum bid level that will be accepted by the merchant (e.g., accepted by the system) for a particular bid item.

As the merchant adding those items (e.g., and entered their minimum bid amounts) to be bid upon to the bid database referenced by the bid program of the internet web portal (e.g., the bid functionality), the bid program through the system could cause a grayed out Bid button to be displayed next to the other action buttons within the individualized frame for the respective bid item and be actionable by a registered user (e.g., provided that the user has previously supplying with system with necessary user information such as identification, location information suitable payment information [e.g., credit card] to allow the user to practice in the BID Functionality.)

When the user sees that grayed out Bid button is shown on product display window for the selected item and the user wishes to place a bid on a selected item, the user appropriately activates the grayed out Bid button. As substantially shown in FIG. 14B, this causes a Bid screen 180 to generally overlay the front page and substantially display a bid amount window 182 that could allow user to input and upload a monetary numeric bid for that selected product item. This Bid screen 180 could further display verbiage containing a warning that if the user's bid is successful (e.g., accepted by the participating merchant) then the user is bound to purchase the selected product item at the user's bid price and that the user's credit card information and authorization on file with the internet web portal could be used to complete the item sale by the Merchant at the close of the bidding process. The Bid screen 180 could further feature an interactive "I Agree" button 184 to have the user agree to terms of completing the bid and sale (allowing purchase of the item [e.g., using credit card information previously placed with the system by the user) and to the other terms of the displayed warning.

Once the user activates "I Agree" button 184 (e.g. clicked upon by the user) then the system could place the users bid value (and any other pertinent user information [e.g., number of items wanted in the bid, etc.) in the bid database; the BID screen could present an interaction OK button and could displaying a message (not shown) substantially stating, "Congratulations! Your bid for the (name of the selected product item) has been successfully placed! Good Luck! Please press the OK button to return to the Wizard." Once the user clicks upon the interactive OK button, the web portal retracts or collapses the Bid window 180 to return the registered user back to the web portal front or home page; and further provide that the previously grayed-out "Place Bid" button would become colored (generally reminding the user that the user has placed a bid upon the item) and otherwise be actionable by the user. An interactive X button on the bid screen itself could collapse or close the screen as well if the User decides not to place a bid on the item to return the User to the home page.

If prior to acceptance of the bid by the merchant, the user subsequently presses upon the colored Bid button within the items individualized frame that could have the system bring up again the Bid screen 180 (along with display text window, etc.) showing the previously submitted monetary numeric bid for that selected product item. Along with the acceptance button, an interactive Delete "X" button (not shown) could now appears on the Bid screen. If the user wishes to change the submitting monetary numeric bid for a new bid amount (prior to acceptance of the bid by the Merchant) then the user can do so by entering that data in display text window and activating the acceptance button 184 again to update the bid database with the user's new bid price. In one possible embodiment, if the user wishes to cancel the placed Bid altogether, the user could activate the Delete button to give the command (e.g., an AJAX call) to the system to delete the bid from the bid database. In another possible embodiment, the bid cancellation could occur when the user enters a zero numeral amount (e.g., $000.00) or other internet web portal designated cancellation text or symbol in bid amount window 182 and activating the acceptance button 184 to delete the bid from bid database.

Bid acceptance in one possible embodiment, the merchant could access a bid widget (bid acceptance program of the system) to click on which bids the merchant wishes to accept. The merchant does not always pick the highest bid in that the highest bid could be for just one of the bid upon item. A lower bid item could be asking for several of the item and those facts could provide the merchant with a higher level of profit over a multiple of sales over a higher bid with smaller or just one sale. Other economic factors that could be considered by the merchant could include selecting which placed items bids to accept.

In another possible embodiment of the bid program, the merchant could access the Bid Meter screen (as substantially shown in FIG. 14A) for a particular bid item for sale through the internet web portal to find out what bids had been placed for an item(s). As accessed by the participating merchant, the Bid Meter screen could further display a bid amount window 168. The Bid Meter could visually present bid revenue calculations (loss, profits displays 166) for user placed bids that were previously placed within a set time period (e.g., with the past seven [7] days). Setting such a time limit for the placed user bids that the Bid program could process could be seen as also encouraging the participating merchant to conscientiously and timely review the user bids as they submitted through the Bid process to ensure viable merchant participation for the benefit of the Bid participating users.

In one possible embodiment, the bid meter screen 160 could be visually presented the bid amount window 168 as a horizontal oriented linear numerical sequence (not shown), which generally displays 0 or zero amount of dollars/cents on the left end of the sequence while showing increasing values as the value range proceeds to the right end of the linear numeral sequence. Associated with the linear numerical sequence could be value indicators (e.g. moving labeled pointers-not shown) or other demarcating means that could point out or otherwise identify those monetary value positions upon the linear numerical sequence that set forth various values embodied by a Bid process for a particular product item (e.g., these positions could include: the manufacturer's suggested retail price of the item product, the merchant-set currently set price of the product; the actual merchant purchase cost of the Bid product item; all of values of the various User Bids placed by the Bid functionality for that selected product item [placed during the appropriate time frame] and the like.) The interactive sliding marker 170 as operated by the participating merchant, the sliding mark could be moved along the length of the linear numerical sequence. The "Accept Bid" button 172 to allow the participating merchant to denote a successful bid and close the biding process for the selected product item. In one embodiment, the merchant acceptance of a bid at one value will be the acceptance of all bids at that value and greater for bid upon item.

Upon the opening of Bid Meter screen by the participating merchant, the sliding marker 170 could be initially presented towards the right side of linear numerical sequence over an associated monetary value for either the product item's retail price or highest placed bid, whichever is higher in value.) The participating merchant then could click upon the sliding marker 170 to move the sliding marker along the linear numerical sequence. The sliding marker 170 could be moved towards the left of the linear numerical sequence (reducing value grade) to come to rest at a particular bid value (e.g., greater in value than the participating merchant's purchase cost of the selected product item) upon the linear numerical sequence and present the totalize number of bids (e.g., at that particular bid value and higher.) The sliding marker 170 also at that position could also display calculated the amount of potential resulting bid revenue for that position (should the participating merchant accept that particular bid value to close the bidding process). Alternatively, the participating merchant could also slide the sliding Marker 170 to the left moving away from the selected product item merchant purchase cost towards 0 value to substantially display the merchant's loss that could be incurred by the participating merchant on that particular item or product if the selected bid was less than the selected product item merchant purchase cost.)

Once the participating merchant has determined the acceptable bid (price) for the selected product item and sets the sliding marker at that desire bid price or value on the linear numerical sequence, the participating merchant could then activate (e.g., click upon) the "Accept Bids" button 184. Upon that activation of the "Accept Bids" button, then all of the placed bids under or to the right (e.g., of greater in value) the sliding marker could be processed by the id program (bid widget) as being accepted by the participating merchant as successful bids resulting in purchases to be completed by the web portal while all of the placed bids to the left of (e.g., of lesser value) the sliding marker would be rejected. To complete or finish out the bid process, the bid program would then charge those successful bid users against their previously provided charge or payment information their respective values of their accepted bids. Once payments had been instituted without default, the java script function could parse through each accepted bid and send each winning user a respective electronic confirmation (e.g., email, text message, or alike) about the accepted bid and the automated payment (charge); containing a suitable purchase/ payment confirmation means (e.g., a bar code or the like) or both. The user then can either have the purchased selected product item shipped to the location of his or her choice, or use the confirmation means to pick up the purchased selected product item at a convenient time at the place of the participating merchant. The JavaScript function could then delete the bid from the bid program. After completing payment arrangements (which could also make use of a checkout payment function completing the charges to the payment interests of the success bid users and obtaining said payment, could send the order to the merchant to be fulfilled and other remaining bid completion functions (e.g., forward the purchase funds to the participating merchant in a suitable and acceptable manner.)

In one embodiment, the web portal could send a conciliatory message (e.g., email, text or alike) to those users whose bids were unsuccessful. Such a message could politely indicate that their bid was, unfortunately, not accepted by the Merchant and that bidding is closed on that selected product item for the present time. The bid process could then delete those unsuccessful bids.

As show in FIG. 14C one possible process for operating the item bidding 200 could start with step 202, merchants placing the bid, wherein the merchant selects the bid item and enters the bid item through the use of the bid meter page. Then in step 204, the merchant enters through the bid page relevant economic information regarding the bid item. Then in step 206, with the users uses the internet web portal to search for desired item. Coming upon the desired item, the user activates the respective activated bid button. Then in step 208, this activation causes the drop down of the bid page to allow the user to place the bid value for the item with the bid database and has the bid value accepted. Then in step 210, the system can then generate dynamic economic factor values as the bids are placed for the item. At this time, prior to the end of the biding, the user can return to step 208 and delete or otherwise alter the placed bid value. In step 212, wherein the bidding has ended the merchant may accesses the bid meter page again and substantially checks the values of the various bids with resulting dynamic economic factor values (profit/loss). The next step 214 has the merchant accepting the desired bid value. In step 216, the winning bid users have their payment accounts docketed for payment of the won bid item, these funds are generally transferred to merchant (for payment of won bid items) who then generally fulfills the orders for the items of won bids, the system then generally deletes the bids (losing and won) from the bid database.

As substantially shown in FIG. 1A, on the outside of the main search bar 36 on sides of the front-page screen could be presented four framed interactive streaming banner visual presentations labeled: My Media 112; Local Deals 114; Coupon Corner 116 and Special Offers 118. My Media 112 and Local Deals 114 could be in a vertical tandem orientation on the left side of the first page while Coupon Corner 116 and Special Offers 118 could be in vertical tandem orientation on the right side of first page. As scrolled information is presented in the interactive streaming banner visual presentation (each presentation having its own specialized information) and the user sees information that the user wishes to further access, then the user could "click" upon the displayed desired information (e.g., a cursor via a front left tab of a mouse or directly touch the desired presentation of a touch screen) to activate that particular presentation and obtain more detail regarding the desired information regarding that presentation.

The three side column functionalities, "Local Deals" 114, "Coupon Corner" 116, and "Special Offers" 118 could provide the user the opportunity to locate discounts, rebates and like on the items for which the user is searching offered by the merchants geographically proximate to the user as well as for special offers from partnered merchants (e.g., those merchants having special arrangements with the web portal providers to participate in the side column selections.) The information so presented in these side column functionalities could be in a continuous stream presentation format, so the interactive identifying text for the particular side column (e.g., "Local Deals"114; "Coupon Corner" 116; "Special Deals" 118 can be clicked upon by the user to load the respective side column information in the product item/search results display window 68 located below the main search bar 36. Simultaneously, the main search bar 36 is locked into respective side column information so displayed in the product item display window 68 so that text inquires entered into the search text entry window 42 will be searched through the respective side column information. Alternatively, the user can manually scroll through the presented side column information using the scroll button 67 on the right side of the product item display window. The search results could then be obtained through single word text searches that are followed by use of the scroll button 67 to move through the obtained search results obtained by the text search.

If there are no results from user text search, then the "No results found" notification will be visually presented by the main search bar. An interactive refresh button could be present on the upper left side of the Search Bar 36 and when activated by the user could refresh all of the side column information so presented to user. When the user is through searching side column information, an interactive colored "X" button (proximate to a side end of the text window) can be activated by the user to take the user back to the "home" or front page of the web portal.

It should be noted that while all four side column functionalities could present their respective information through continuous scroll or tickertape presentation, some users may find the several scrolling screens to be somewhat disconcerting and a distracting in conducting a product item search in the web portal. To alleviate or at least mitigate this undesired effect, at least one embodiment of the invention could allow the user to collapse the separate presentations of the four-side column functionality into a single tickertape type presentation wherein all the information of the four side column functionalities is displayed in one scrolling ticker tape presentation at the bottom of the webpage. This scrolling presentation could still be interactive in that the clicking by the user upon the desired passing information could bring up a suitable response (opening a webpage featuring the local deal, coupon, special corner) or otherwise allowing the user to access the selected social media information in greater depth.

Figure 15:
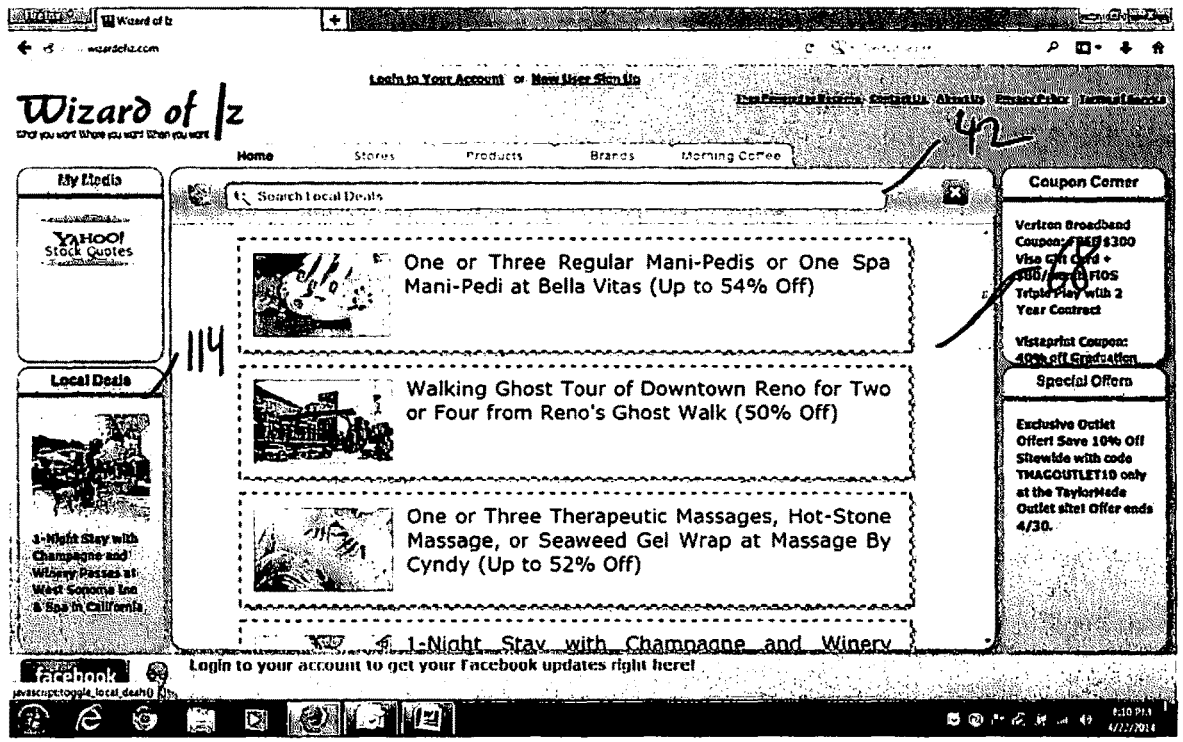
FIG. 15 substantially shows a screen capture of a screen of local deals side column with narrowed search results of the web portal of the present invention.

As substantially shown in FIG. 15, the Local Deals side column 114 could display various local deals geographically available to the user based on current Zip Code and surrounding area that the user (i.e., and the user's www searching device) are physically located in, not just the area of the user's residence. If the user is accessing the web portal while moving on the road or alike, the web portal could display the local deals available at user's current location (e.g., IP address data-based geolocation tracking based on the server location being used by the user to access the web portal). The user accesses the information presented by the Local Deals by clicking upon the interactive "Local Deals" text at the top of the Local Deals side column tab 114.

Figure 16:
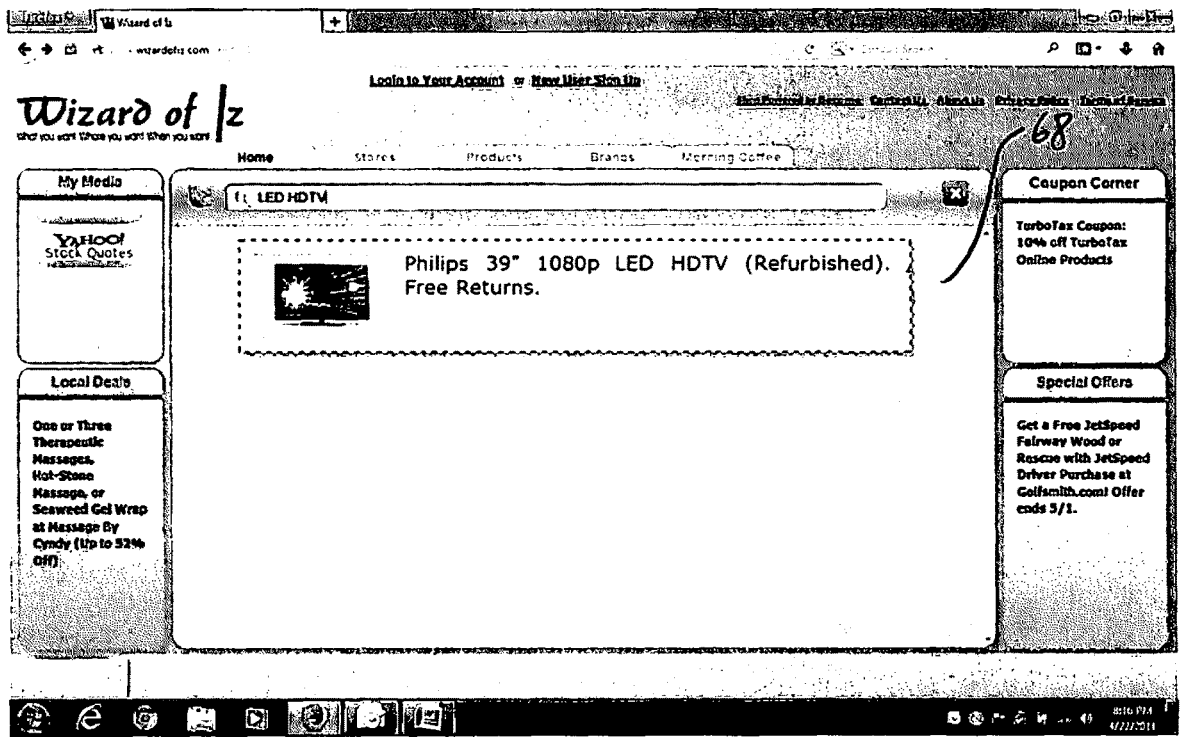
FIG. 16 substantially shows a screen capture of a screen of local deals side column with narrowed search results of the web portal of the present invention.
Figure 17:
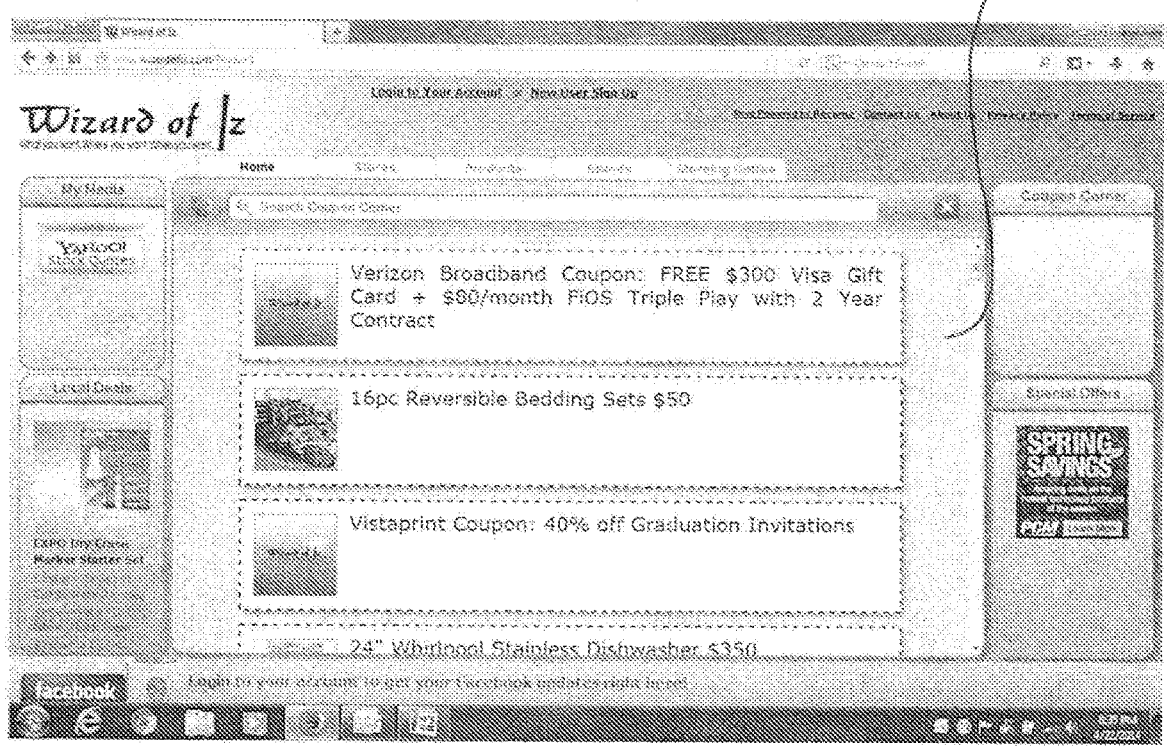
FIG. 17 substantially shows a screen capture of a screen of coupon side column with narrowed search results of the web portal of the present invention.
Figure 18:
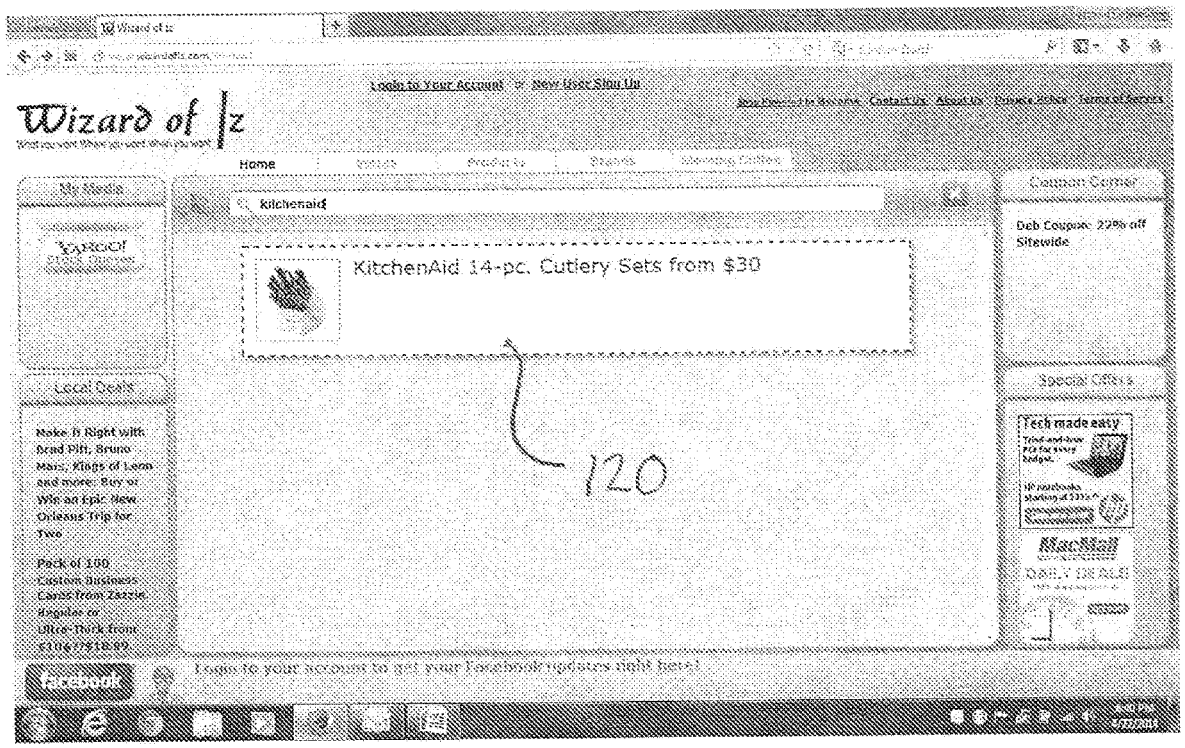
FIG. 18 substantially shows a screen capture of a screen of coupon side column with narrowed search results of the web portal of the present invention.

Upon the activation of the Local Deals button 114, the product item/search results display window 68 below the main search bar that displays all the local deals being scrolled through the Local Deals side column. The best local deal search results could be obtained through single word text searches and then using the scroll button to scroll through the obtained text search results. As substantially shown FIG. 16, the Local Deals search results in the product item/search results display window 68 can be narrowed down to a more limited number of entries. By clicking upon a specific desired Local Deal information, another internet browse page could be opened to the merchant website that offers the local deal in that user is interested and substantially allows the user to access greater information on that particular local deal. As needed, the user could possibly download or printout though the user's electronic device the necessary information to take advantage of the desired local deal. To return back to the web portal home page, the user could click out of the merchant's webpage to collapse the second As substantially shown in FIG. 17, Coupon Corner side column functionality is a means search for one or more coupons as provided by participating merchants (e.g., merchants from the group of merchants whose items make up the mega database). Upon the user's activation of the Coupon Corner identifying text, a coupon product item display window 120 could open in the middle of the page to generally display all the coupon information being scrolled through the Coupon Corners side column. The best coupon search results could be obtained through single word text searches in the search bar text window and then using the scroll button to scroll through the obtained text search results. As shown in FIG. 18, the coupon search results can be furthered narrowed down to a more limited number of entries. By clicking upon an interactive specific desired coupon information, the system could open another internet browser page to the merchant website that offers the coupon in that user is interested and to substantially allow the user to access greater information on that particular coupon from the merchant's website. As needed the user thorough the user's electronic device could possibly download or printout the necessary information from the merchant's website to take advantage of the desired coupon. By closing out the second webpage, the system would return the user to the home page of the invention's web portal.

Figure 18A:
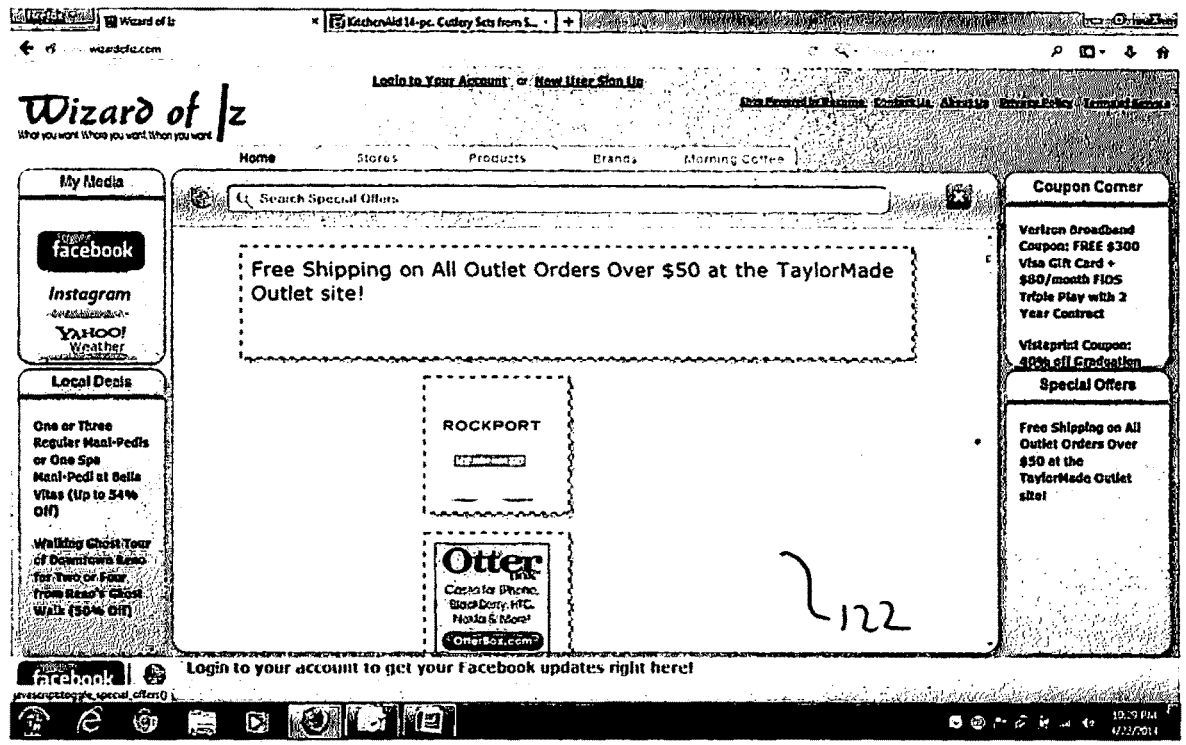
FIG. 18A substantially shows a screen capture of a screen of special offers side column with narrowed search results of the web portal of the present invention.
Figure 18:
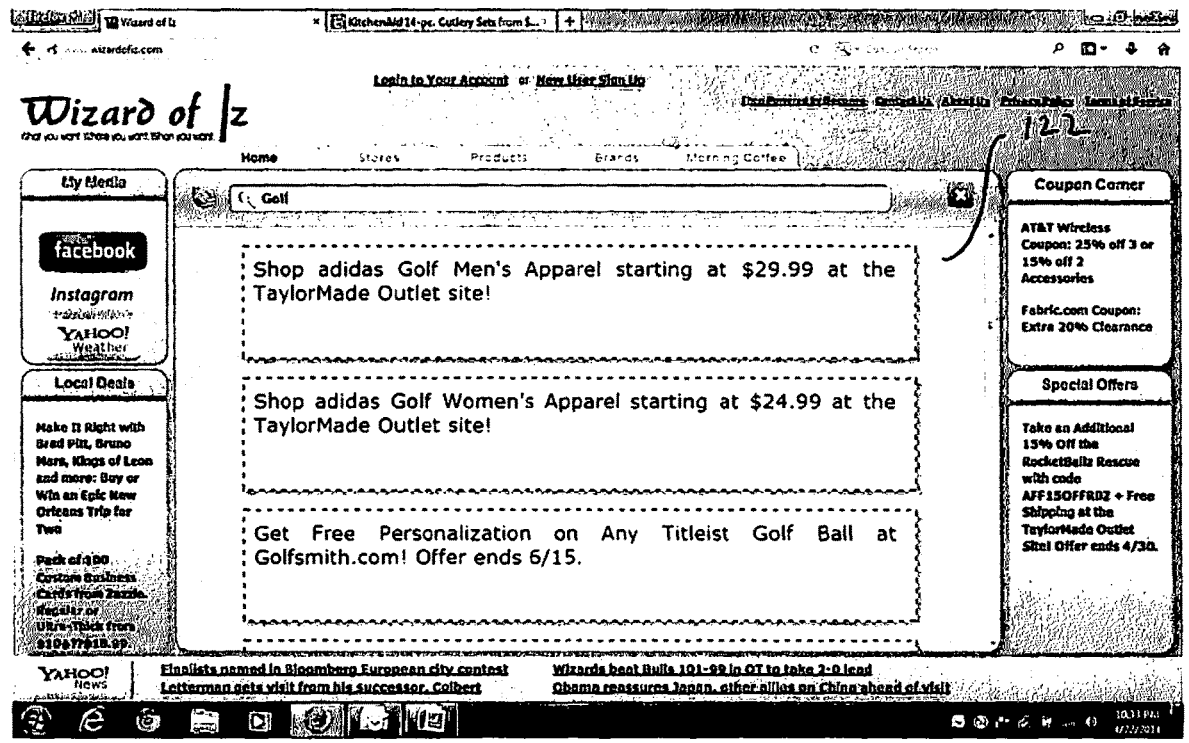

As substantially shown in FIGS. 18A and 18B, the user's activation of the interactive Special Offers side column could open a special offers display window 122 in the middle of the page below a search bar text window to generally display all the special offer information various offers and advertisements from web portal's partnered merchants that is being scrolled through the Special Offers side column to the user. A scroll button to the right side of the special offers display window allows the user to scroll through all of the displayed special offers and advertisements shown in the special offers display window. In order to get the broadest returns from the search bar text window from a text search, the user should use single-word searches and then use the scroll button on the right side of the screen to look at the results. If no results are displayed, then there are no special offers available for what user were searching for. The blue refresh button located on the left corner of the Search Bar could refresh the offerings presented in the Special Offers column. By clicking upon a specific desired coupon information in the special offers display window, the system could open another internet browser page to the merchant website that offers the special deal that the user is interested and to substantially allow the user to access greater information from the merchant web site on that particular special offer. As needed the user could possibly download or printout through the user's electronic device the necessary information to take advantage of the desired special deal. By closing out the second webpage, the user could return to the home page of the web portal.

My Media side column 112 is a social media functionality that generally requires the user to first go through a registration process through the invention's web portal to allow the user to give to the system necessary personal user information, personal preferences and necessary permission/authorization to access third party websites. This allows the system as requested by the user to continuously update and display the third-party website information upon user activation. This continuously presented and updated information allows the user to access selected third-party website provided information (e.g., news, social media, financial information) from third party websites.

Figure 19:
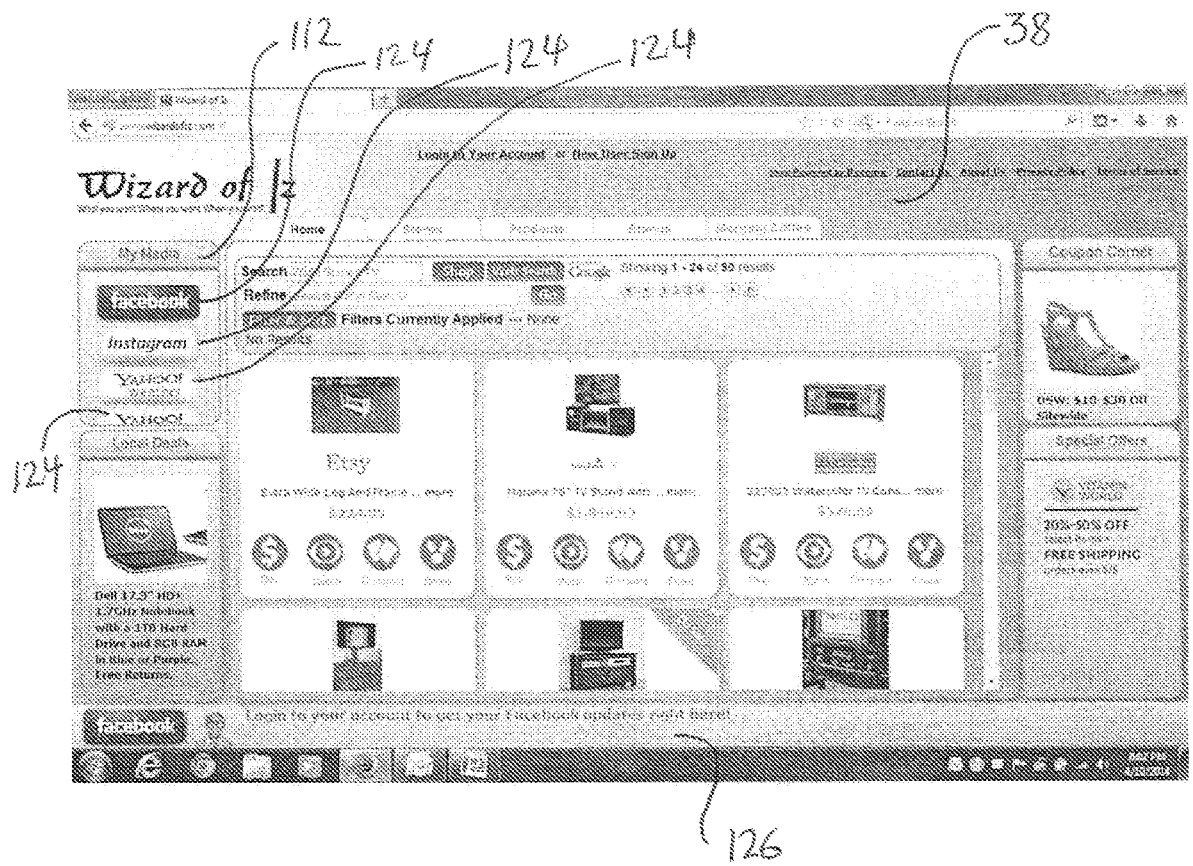
FIG. 19 substantially shows a screen capture of a screen of tickertape display the present invention of the web portal of the present invention.
Figure 20:
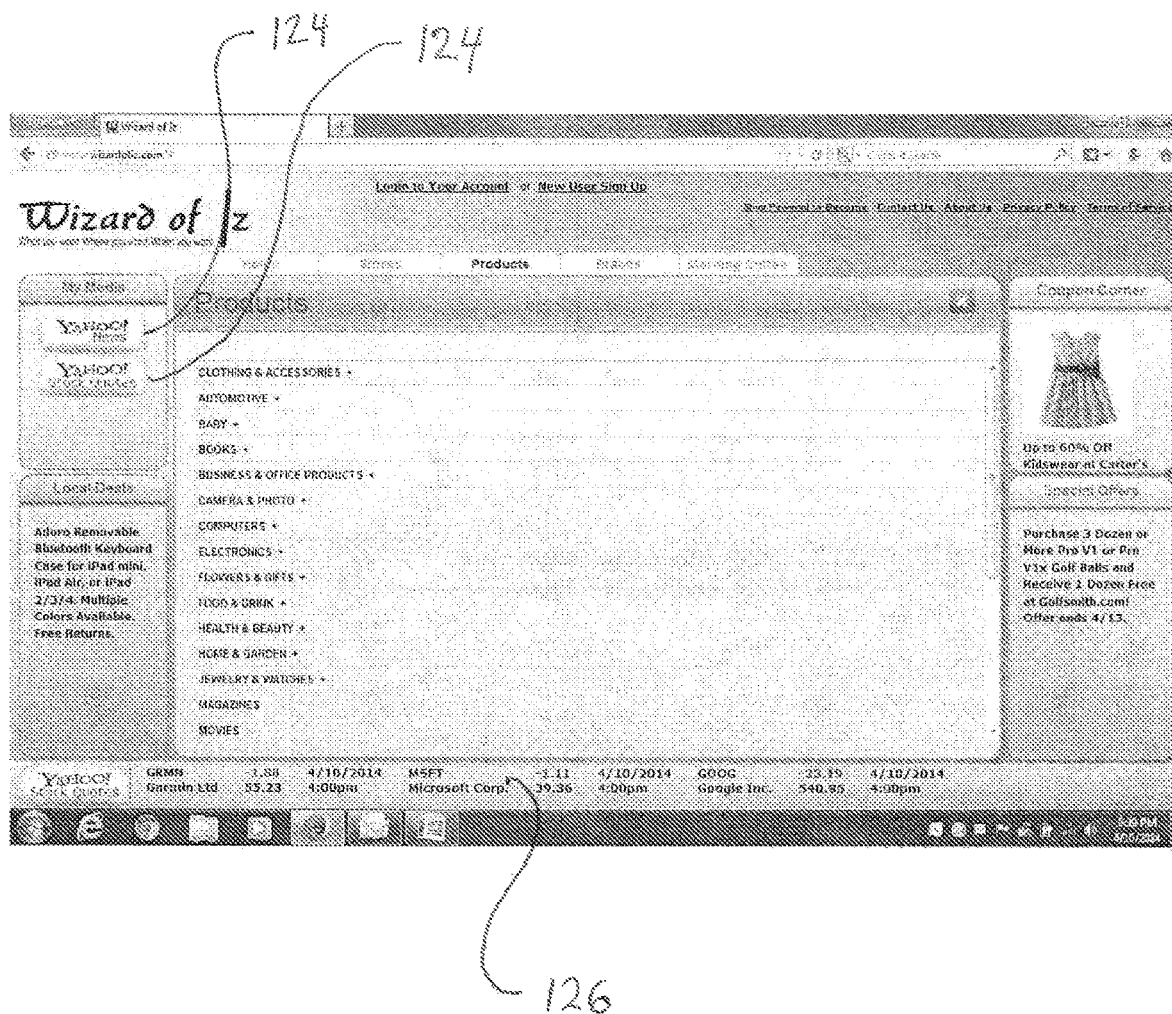
FIG. 20 substantially shows another screen capture of a screen of tickertape display of the web portal of the present invention.

As substantially shown in FIGS. 19 and 20, the social media functionality can present a list of interactive media selection buttons that scan be scrolled through (e.g. through "up" and "down" buttons appearing at the top of the column-not shown.) Each category button can be labeled and control the presentation of a certain category of data by the tickertape display screen 126 (e.g., continuous horizontal scrolling of said data) located along the bottom of the front page. Data categories afforded by these selection buttons can include: stock quotes, news, weather, INSTAGRAM®, an application and service allowing the online sharing of pictures and videos, FACEBOOK®, a social networking site, and the like. When the user activated a particular category button, that data, information or the like as represented by that category label of the button will be presented in a continuous horizontal scrolling fashion in the tickertape display 126. More than one category button 124 can be activated at a time to have several categories of information being presented in the tickertape display 126. If a certain category of information is no longer desired to be displayed upon the tickertape display 126, the user can click off the appropriate category button 124. The web portal system may also present in the tickertape display information that is not directly controlled by the user (e.g., user directed advertisements, and the like.)

The tickertape display 126 located along the bottom of the front page 38 presents a horizontal scrolling or moving display of information regarding on the user's personal social media, email, news, weather, stock, targeted advertisements for the user; and alike for the use. The tickertape display 126 may further provide interaction in that the tickertapes displayed information bits may actionable in certain categories. For instance, a news item (e.g., CNN news feed article) when the user clicks upon it causes the system to open another or second webpage of news organization website that is providing the news item, the second webpage providing greater information on desired news item.

In one possible embodiment, the system upon receiving an email though the users email program could cause the ticket tape display 126 to be shown an interactive information message regarding the incoming email (e.g., displaying email information such as date/time, sender, title and likenot shown). When the user activates the information message, the system could bring up the users email program in a separate or overlaying window to allow the user to access the full incoming email.

Similarly, a newsfeed from a social media web portal (such as FACEBOOK®, a social networking site) in that user has an account could be displayed another interactive information message. The user upon "clicking" on that information message could be taken to a Wizard message window (not shown) to handing communications with the social media web portal. For example, when clicking a newsfeed from a friend's FACEBOOK®, a social networking site, timeline that is displayed in the Tickertape display 126, the user could be taken to the FACEBOOK® (a social networking site) social media to be able to post to that friend's timeline (not shown.)

The web portal could display within the scrolling tickertape display 126 the user's social media accounts (not shown) as well as user's selected stocks, local weather forecasts, news and other information. The tickertape display 126 could allow the user to have immediate access to their social media, weather, news, stocks and other information while they are using the Main Search Bar 36 to search for product items in the mega database or on the internet.

Registration

Figure 21:
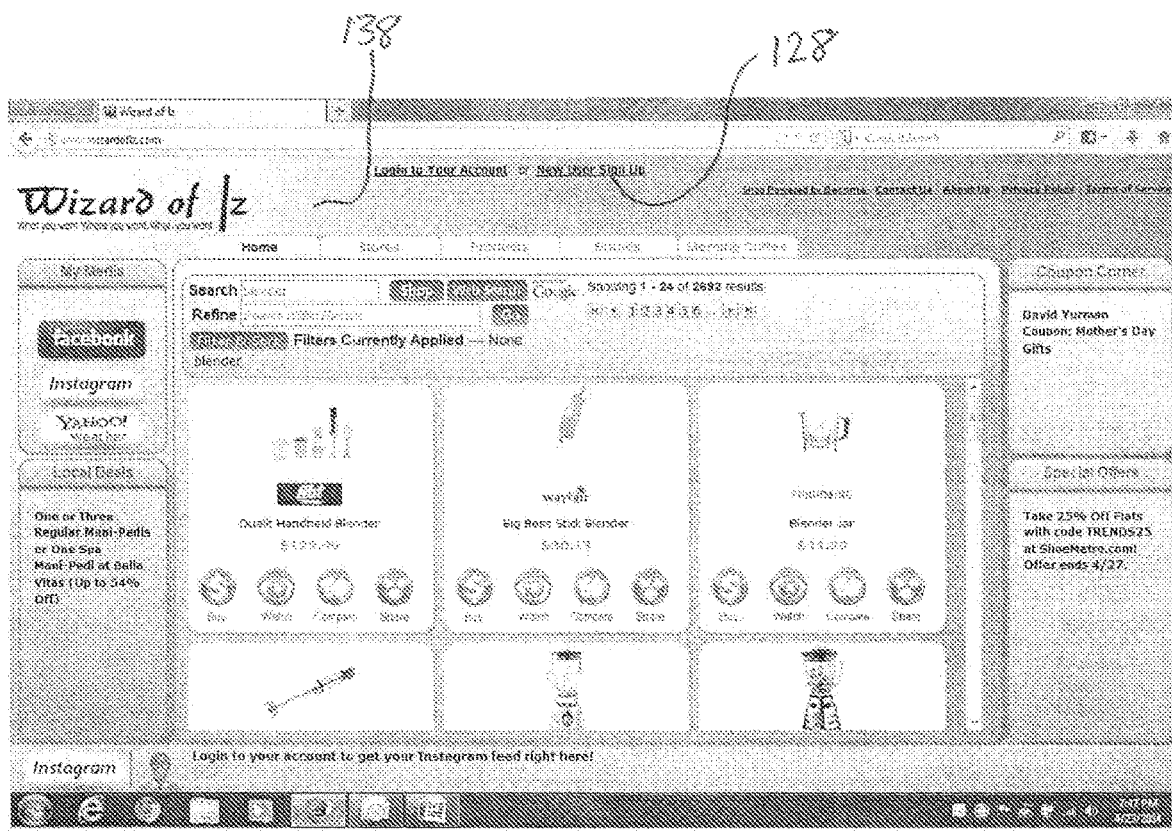
FIG. 21 substantially shows a screen capture of a screen of homepage with New User Signup interactive button of the web portal of the present invention.
Figure 22:
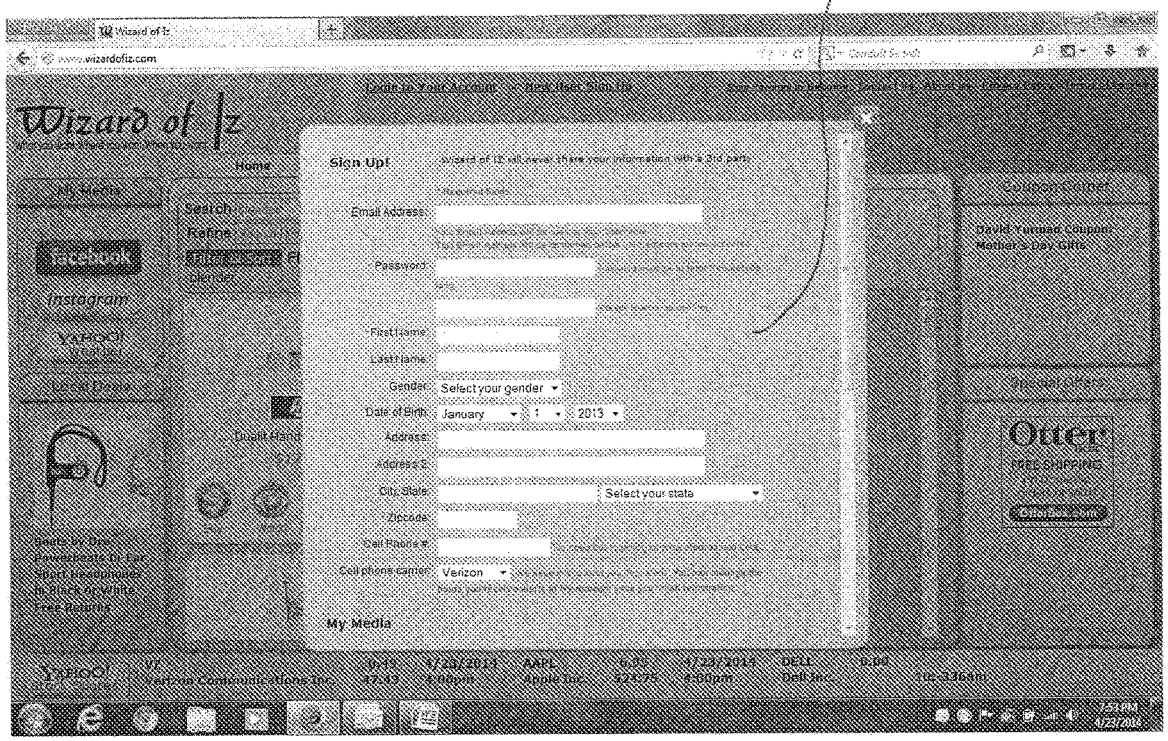
FIG. 22 substantially shows a screen capture of a signup overlay screen for the user's initial registration of the web portal of the present invention.
Figure 23:
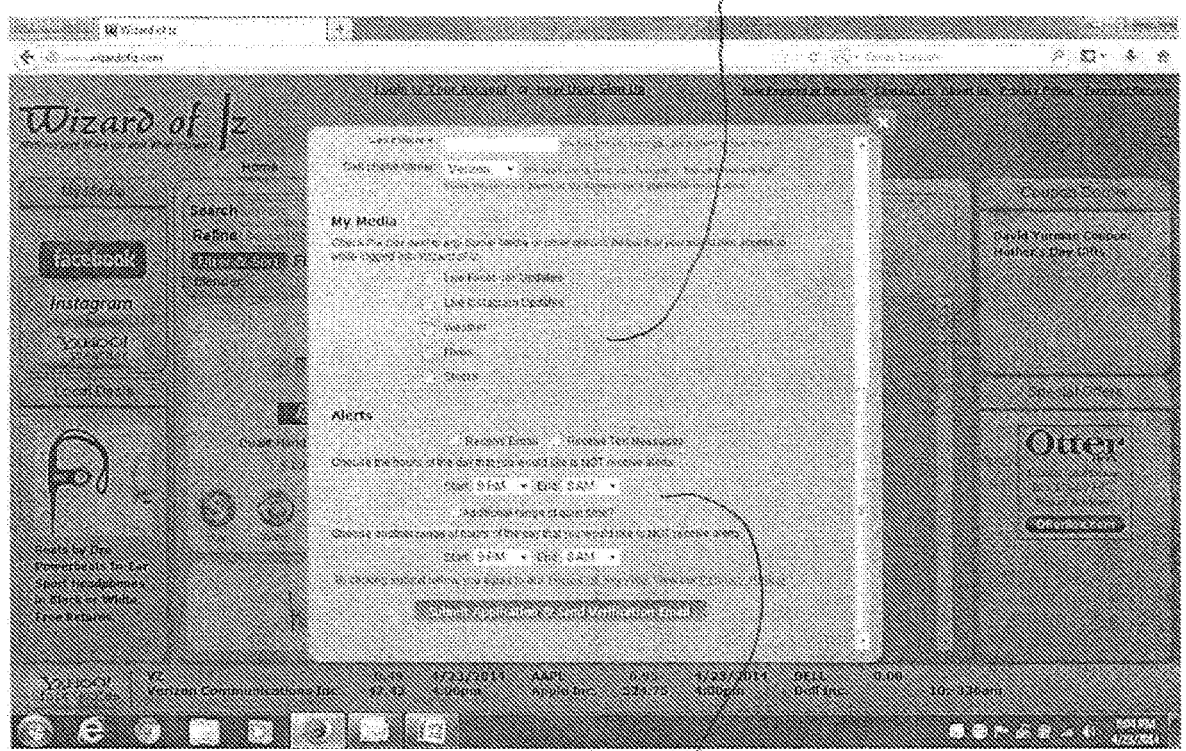
FIG. 23 substantially shows a screen capture of the remainder of the signup overlay screen for the user's initial registration of the web portal of the present invention.

For the use of the personal social media and other information presentations and for other functionalities (e.g., the Bid button) as provided by the web portal to the individual user, the user may be required to engage in a registration process register with the internet web portal. As substantially shown in FIG. 21, at the top of the home page 38 of the web portal, could be an inactive text of "New User Sign Up". The user may activate (e.g., click upon) the interactive text to bring up an overlay registration screen as substantially shown in FIGS. 22 and 23.

The registration screen can present a three sections of labeled text/check box windows, the first section ("signup") 132 could be used for entering user personal identification information; the second section ("my media") 134 could be used for entering the user's social media preferences and the third section ("alerts") 136 could be used for establishing how and when the web portal should issue an alert message to the user. The text windows for the "signup" can could include those text windows labeled and accepting information of user's email address; user password selection; user full name, age and gender; user full mail address information; and user's cell phone and cell carrier. The cell phone, cell carrier and user name information could be used by the web portal for prompt (real-time) sending of text alerts and messages from the web portal to the user. User Zip code information could be used by the web portal to appropriately select local deals to be presented to the user. The user birthday information could be used by the web portal to generally ensure the user are of legal adult age (those users not of legal adult age lack capacity to contractually purchase items generally should be excluded from the web portal's registration practice.)

The windows for My Media section 134 could be a set of check boxes respectively labeled live FACEBOOK® (a social networking site) updates; live INSTAGRAM®, (an application and service that allows the online sharing of pictures and videos) updates; weather; news; stocks and the like through which the user could check to select having the web portal obtain form those media sources present real time information through the scrolling tickertape screen at the bottom of the homepage.

The windows for the Alerts section 136 if the user activated send the user alerts and during what portions of the day. Two check boxes could allow the user to indicate that the user whether the user would like to receive alerts and in what format (e.g., text, email or both.) Two time range windows (using drop down time lists, one list for selecting the beginning time for the no message time period and one list for selecting the ending time for the no message time period) could be used to allow the user to set two separate time periods during the day when the user does not want to receive alerts and the like from the web portal. In this manner, if the user is participating in price change alert for specific product item and the price change occurs during a period of time selected by the user not to receive such alerts, then the web portal will then hold the alert until of the end of the specified time period to then send the alert to the user.

At the bottom of the registration screen could be an interactive button labeled "Submit Application and Send Verification Email" 138. Proximate to that submit button 138 could be the message "By clicking submit below, you agree to our Terms of Service. View our Privacy Policy". The terms of service and privacy policy could respectively be interactive text that upon user activation could open a separate web page displaying the web portal's terms of service information or privacy policy to allow the user to review the terms of each as needed. Activating the Submit button would load the previously entered user information into the web portal's operating system and associated databases as well as act as a confirming act binding the user to the terms of the Web portal's Terms of Service and Privacy policy. If the user does not wish to complete the registration process, the user could click interactive "X" button at the top of the screen to close out the registration screen without entering any information placed in the screen entries by the user and returning the user back to the homepage.

Figure 24:
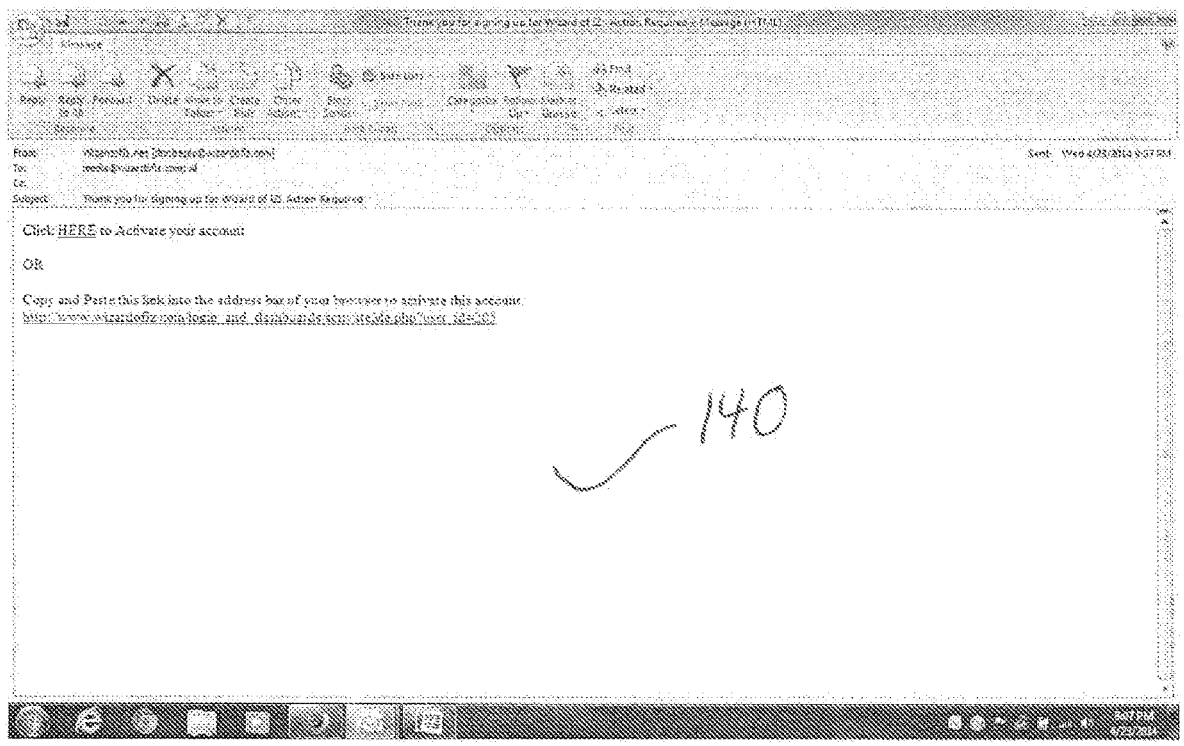
FIG. 24 substantially shows a screen capture of confirming registration email sent by the web portal of the present invention.
Figure 25:
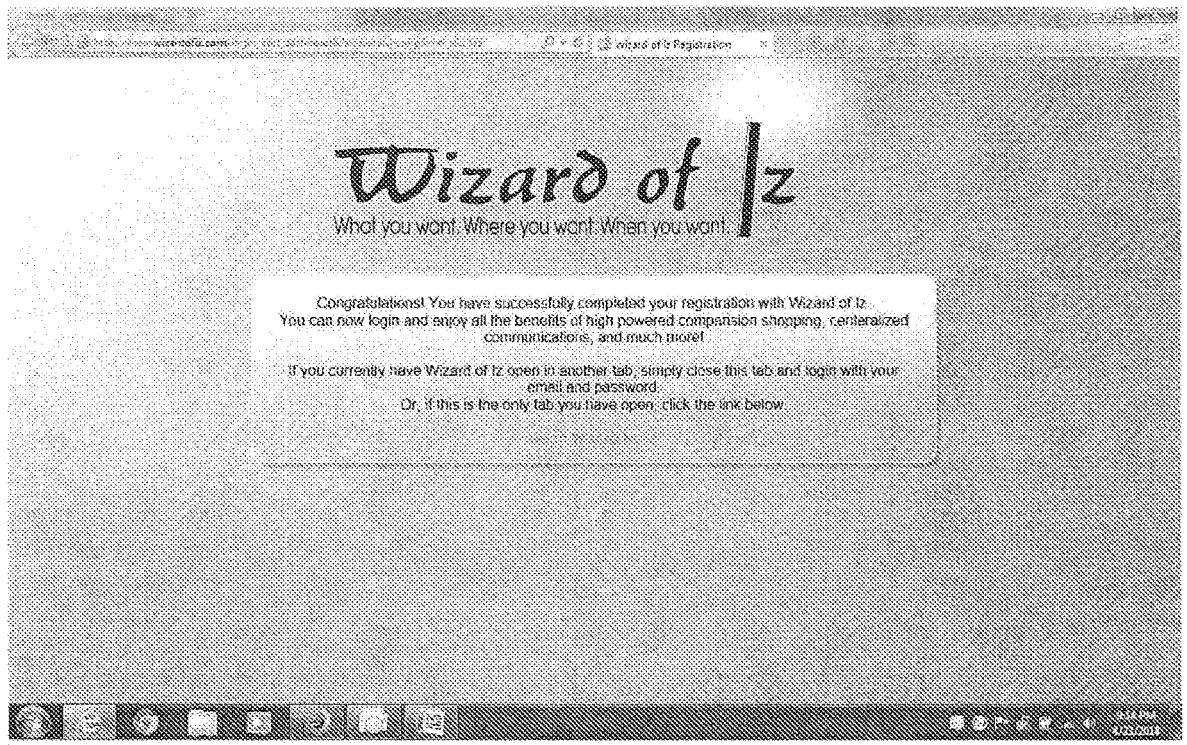
FIG. 25 substantially shows a screen capture of an initial registration complete screen the web portal of the present invention.

As substantially shown in FIGS. 24, 25 upon further activation of "Submit Application and Send Verification Email" button, the web portal using information submitted by the user during the initial registration process issues an new account email to the user with a click on link or a URL address to copy and paste into a web browser search bar to open a completed registration webpage 142 that confirms that the user as being registered with the web portal. An interactive button on this page appropriately labeled when activated by the USER will close out the completed registration webpage and return the user to the home page of the web portal.

Figure 26:
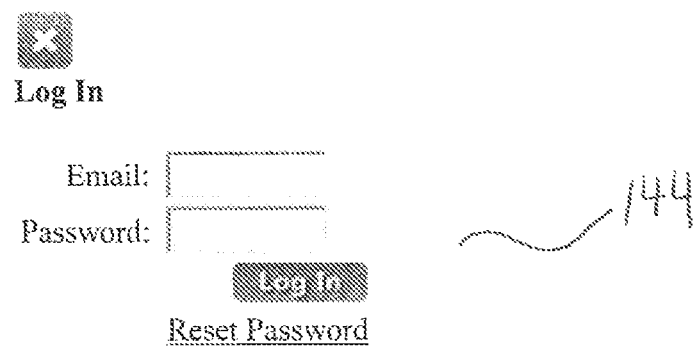
FIG. 26 substantially shows a screen capture of a log in screen for the web portal of the present invention.

As substantially shown in FIG. 26, at the homepage, when the user subsequently signs onto the web portal by clicking the interactive button labeled "Login" which could bring up an overlay Login screen 144 with ID text window (e.g., to be filled in with the email previously supplied by the user during registration) and Password text window (e.g., to be filled in with the password previously selected by the user during registration.) The Login screen could further present the interacted Reset Password text that upon activations could replace the Login screen with a password reset screen (not shown) to allow a user, after properly entering required user security and ID based information in approximate text windows will allow the user to reset the password previously being used for Login by the user. If the password is not being reset, after the proper user identification information has been entered in the ID text windrow and Password text window, the user can click upon the interactive Login button to complete the sign into the web portal and be returned to the homepage.

Figure 27:
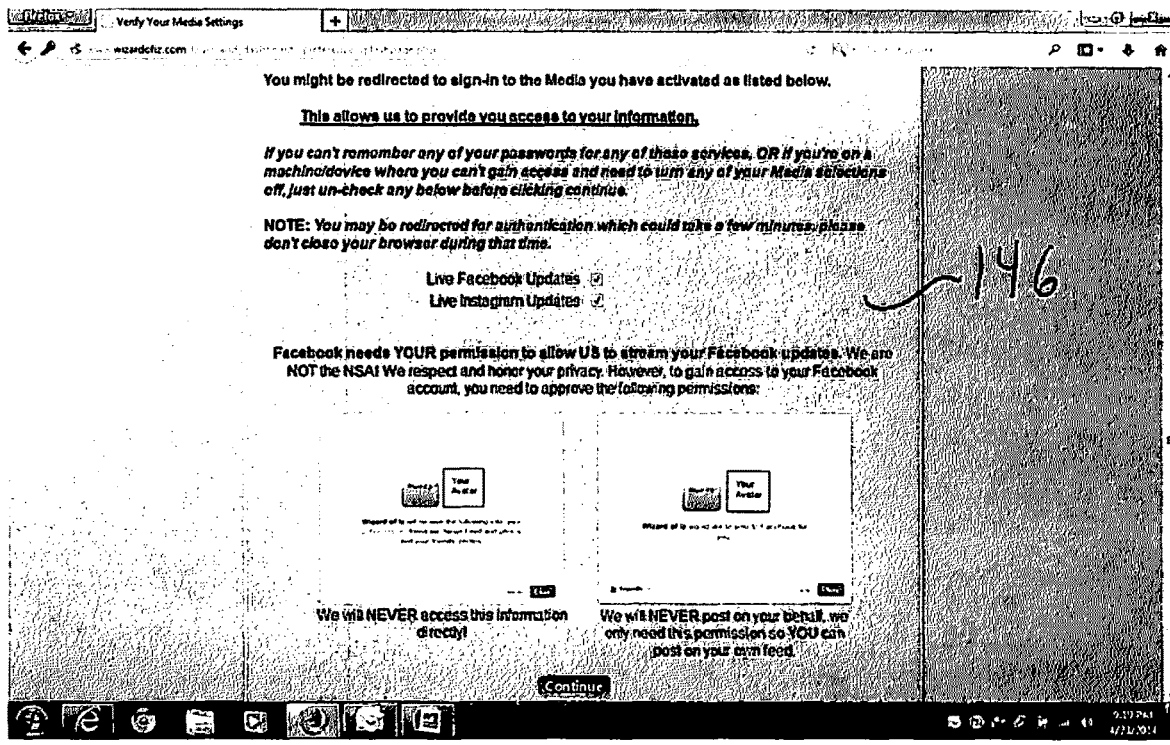
FIG. 27 substantially shows a screen capture of verify social media settings screen for the web portal of the present invention.

As substantially shown in FIG. 27, upon login, if it is the first login/sign in since the user's initial registration with the web portal, then the user could be directed "Verify Your Media Settings" web page 146 of the internet web portal which shows what social media selections the user enabled during registration. This webpage further displays text that explains to the user what the web portal can and cannot do in relation to the user's social media pages (e.g., INSTAGRAM®, an application and service that allows the online sharing of pictures and videos and FACEBOOK®, a social networking site). To activate further connection between the web portal and user's social media sites (so that the social media sites can direct appropriate update traffic to web portal for appropriate presentation to the user, the user can activate the interactive Continue button.

This initial connection process may entail obtaining more registration information and additional permissions from the user to ensure that the user has given proper and understanding authority to web portal to access the user's social media website(s) and to continually obtain user information and data from the respective user's social media website(s). Anytime the user again logs onto the web portal, user could be presented a different screen (the web portal heretofore having obtained and confirmed the user's permission to access these social media website[s]) to activate the desired social media selections for that particular login period utilizing an easier and more abbreviated format that skips obtainment and confirmation of user's permission.

Figure 28:
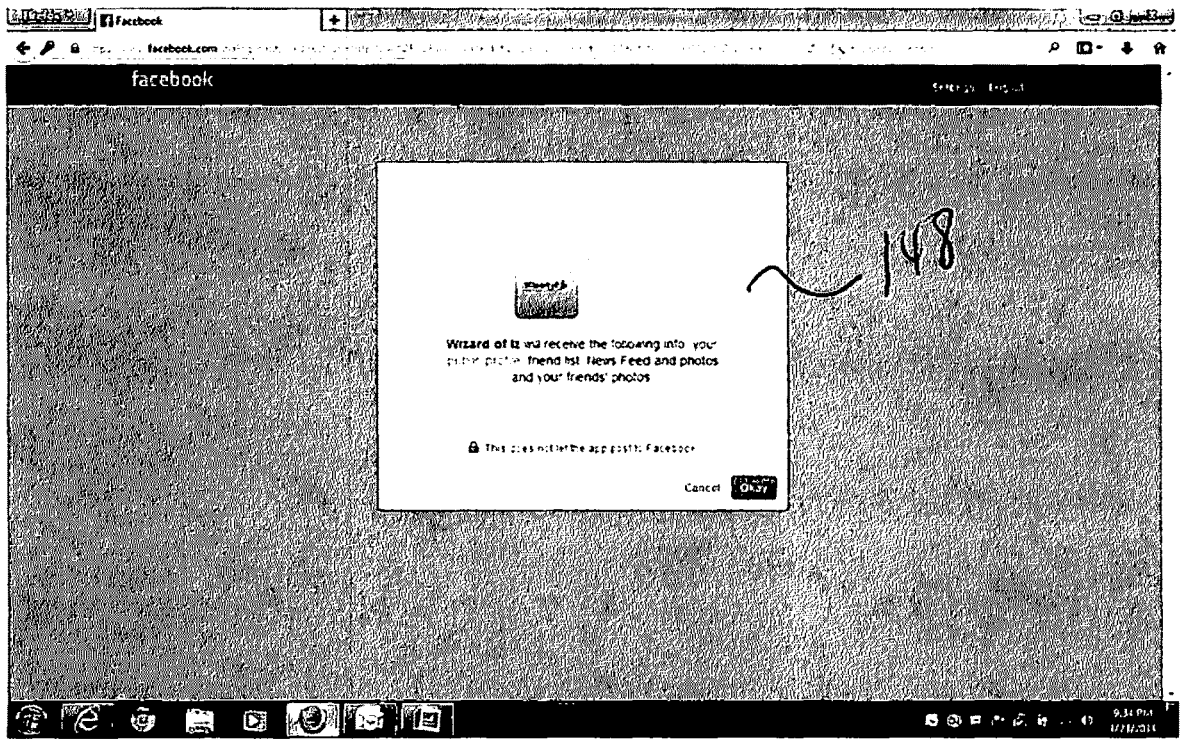
FIG. 28 substantially shows a screen capture of confirming permission screen for the web portal of the present invention.
Figure 29:
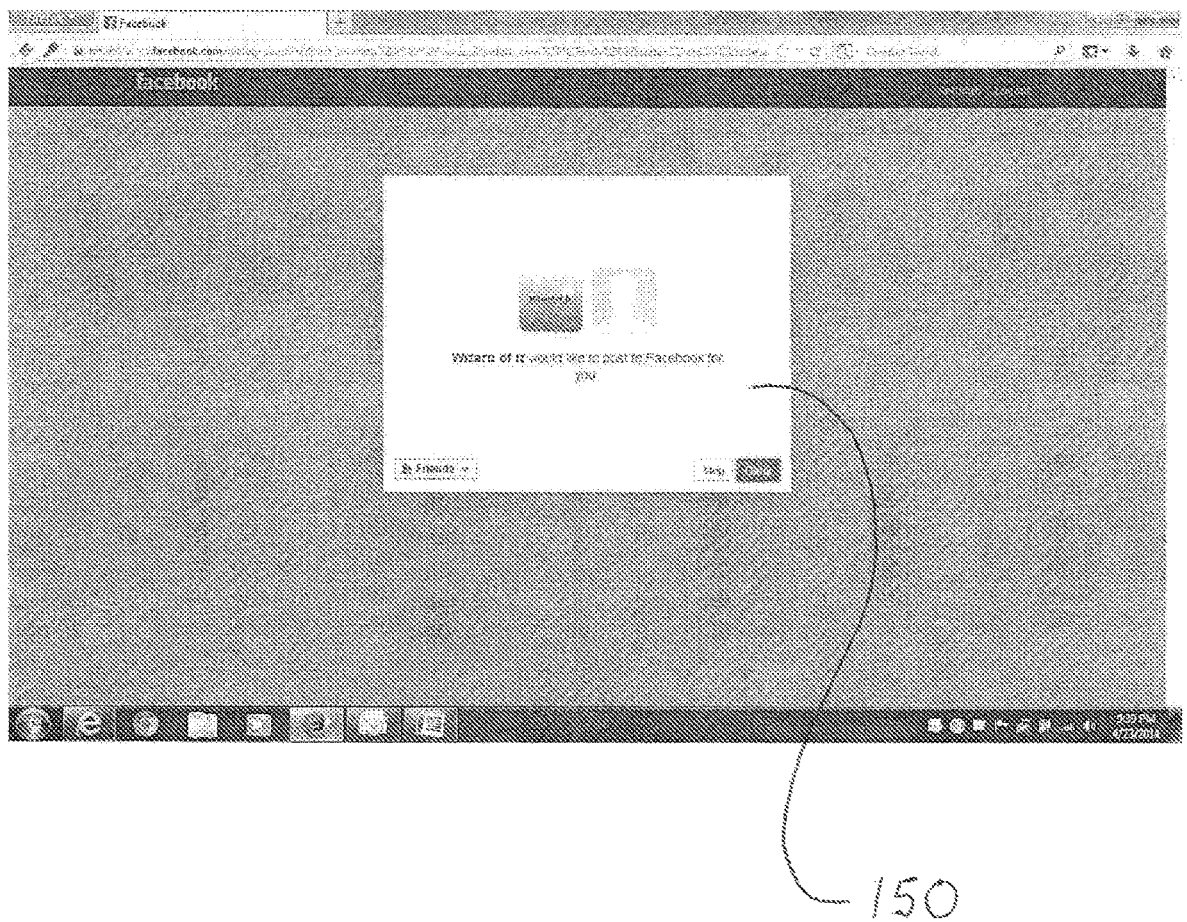
FIG. 29 substantially shows a screen capture of allow posting confirmation screen for the web portal of the present invention.

The user in activating the Continue button could be directed to the selected social media webpage (e.g., the FACEBOOK®, a social networking site, login page.) As substantially shown in FIG. 27, the user at that webpage could then sign onto the user's account with the social media webpage. As substantially shown in FIG. 28, the user's action of signing in on the user's social media website sign in or login could then present the user with another request permission webpage 148 from the social media website identifying (e.g., in displayed text) that the social media website is requesting permission from the user to allow the social media website to send to the web portal certain user related information (e.g., public profile, friend's list, news and photo feeds, friend's photos from users social media website account.) This text could further inform that acceptance of these conditions by the User will not authorize the web portal to post information upon the user's social media website account. As substantially shown in FIG. 29, once the user accepts these conditions (e.g., by activating an interactive Continue button), the Information Being Sent webpage can then be closed and be replaced with yet another social media website webpage "posting user's social media account to Web portal". In this webpage, the social media website is seeking the user's permission or authority to allow the user to access the user's social media account through the web portal. Upon the acceptance of these posted terms at this webpage, the user can then directly access through the internet web portal (e.g., through activation of the social media side column's display tabs and alike) the user's account at the social media website.

Figure 30:
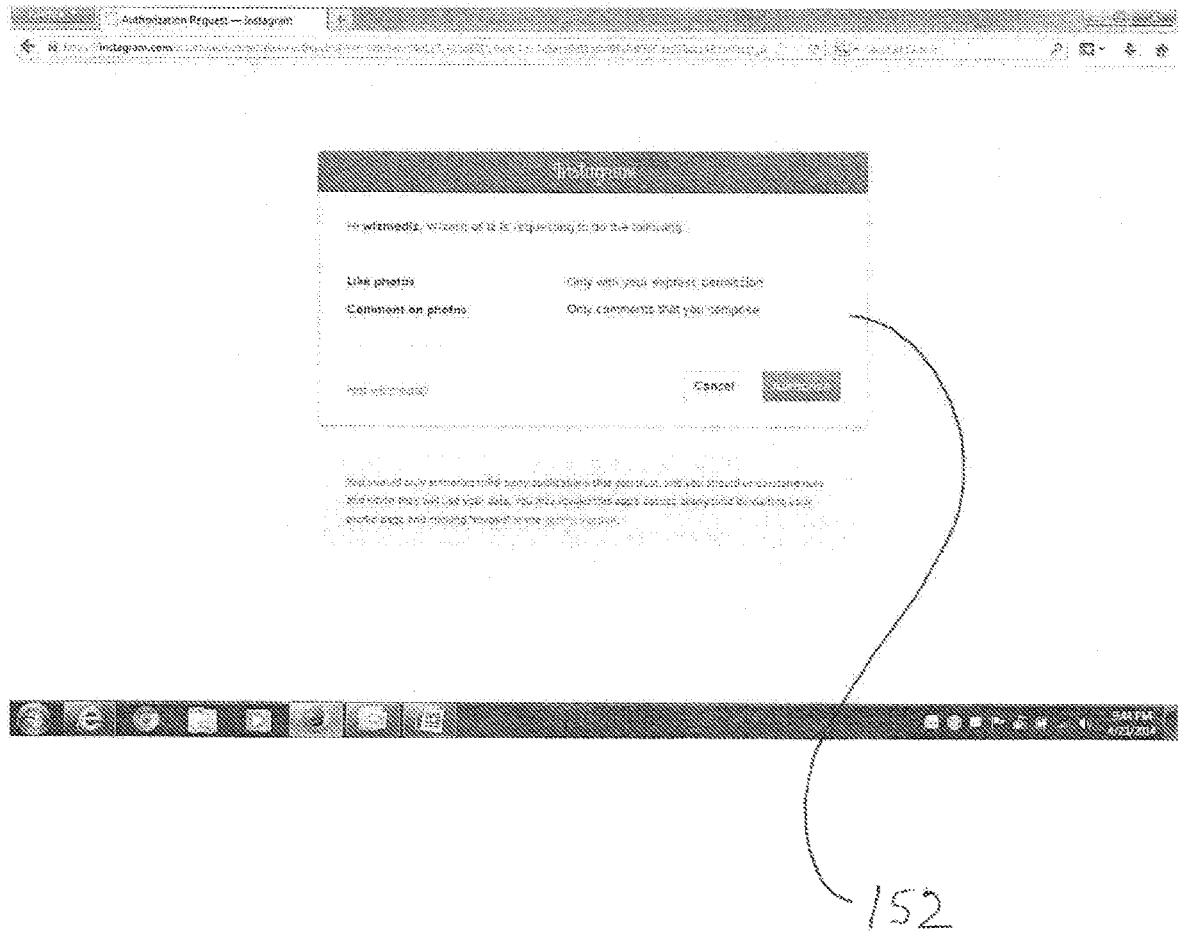
FIG. 30 substantially shows a screen capture of second social media website access screen for the web portal of the present invention.

As substantially shown in FIG. 30, if the user has initially authorized web portal access to another or second social media website (e.g., such as sharing-based website that allows a user to share photos and videos with others, such as INSTAGRAM®, an application and service allowing the online sharing of pictures and videos.) That second social media website could have an authorization webpage brought up by web portal during the subsequent registration process, which may allow the user to grant permission to the second social media website to allow access by web portal to user's information as hosted by the second social media website. The social media logon information obtained by the web portal during this subsequent or secondary registration process will be stored for security purposes on the web portal's encrypted database. The above two descriptions for procedures to allow the web portal to secure social media website logon authorization and obtaining user permission to do so and could be considered exemplary, with other types of procedures being used with other social media websites and application being used with the invention as well.

After the user has completed the part of the additional registration process that allows for the web portal to gain access to and obtain/display user information and data from the desired social media websites, any subsequent login by the user onto the web portal is much faster because the social media website(s) access information is already obtained (e.g., the web portal's automatic authentication process for the social media websites is enabled) so the user need only to decide whether to have the information sent from the social media websites be presented by the web portal. As substantially shown in FIG. 31, the login/log on second screen could advise the user that in case of failure of the automatic authentication process (due to a server failure or internet service provider temporary lack of service) the user could be redirected to the directly to the social media website logon screens that the user have used before to log onto the user's social media website(s). Further, if the user is unsure of the appropriate passwords or simply does not want to incorporate the checked social media updates into the web portal, the user could just uncheck the applicable social media interactive check box or boxes and then could activate (e.g., click upon") the interactive orange "Continue" button. If the user unchecked any of the social media boxes and click the orange Continue button, user could be taken to the web portal Home Page, but the use generally would not otherwise have access to user's social media within the web portal during that login/log on session. As such, the user could have access to the other remaining other web portal functions.

CONCLUSION

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

What is claimed is:

1. A method of presenting on a display screen, a bid acceptance display setting fourth bid information relating to one or more bids placed through an internet commerce web portal by potential purchasers registered with the internet commerce web portal for the purchase of one or more bid items offered by a merchant registered with the internet commerce web portal for sale through the internet commerce web portal comprising the following steps:

(A) statically displaying for the duration of a bidding a first indicator in first location of a plurality of locations in the bid acceptance display, a first indicator showing at least one static economic factor providing a value that affects merchant's profit or loss for selected a bid for the one or more bid items;

(B) dynamically displaying a second indicator in a second location of the plurality of locations in the bid acceptance display, the second indicator showing a bid profit amount, indicating a profit amount, if any, that the merchant incurs on an acceptance of a bid, calculating the profit amount using a value of the selected bid and the value of the static economic factor;

(C) dynamically displaying a third indicator in a third location of the plurality of locations in the bid acceptance display, the third indicator showing a bid loss amount, indicating a loss amount, if any, that the merchant incurs on the acceptance of the bid, calculating the loss amount using the value of the selected bid and the value of the static economic factor;

(D) dynamically displaying a fourth indicator in a fourth location of a plurality of locations in a bid acceptance display, the fourth indicator being a fixed axis referencing bid numerical values, those bid numerical values being fixed along the fixed axis, and a bid acceptance value designator that moves along a length of the fixed axis, the bid acceptance value designator's movement being controlled by a sliding button display found proximate to the fourth indicator, the second and third indicators being displayed proximate to the fourth indicator as well; engaging the slide button display and moving the bid value indicator along the fixed axis to change the displayed value in either the second indicator or third indicator; and (E) displaying a bid acceptance button upon the bid acceptance display, activating the bid acceptance button, and transmitting at least one parameter for the merchant's acceptance or rejection of potential purchasers' bids as placed for the one or more bid items for sale based upon the location of the bid acceptance value designator upon the length of the fixed axis.

2. The method of claim 1 further comprising a step of creating the at least one static economic factor by the internet web portal bid program using bid item information as provided by the registered merchant.

3. The method of claim 1 wherein the at least one static economic factor can be an economic factor from a set of economic factors consisting manufacturer's suggested retail price, merchant's actual purchase price of item, merchant's item sale price.

4. The method of claim 1 wherein the at least one static economic factor is not displayed to the potential purchasers.

5. The method of claim 1 wherein the second indicator is not displayed to the potential purchasers.

6. The method of claim 1 wherein the third indicator is not displayed to the potential purchasers.

7. The method of claim 1 further comprising a step of initially presenting the bid acceptance value designator upon the linear axis over an associated monetary value for either the bid item's retail price or a highest placed bid, whichever is higher in value.

8. The method of claim 1 further comprising a step of changing the one or more of presented static economic factors, dynamic economic factors or both after the close of bidding by at least changing a numeral amount of the minimal bid value that the registered merchant would accept for a bid.

9. The method of claim 1 wherein the second and third indicator displays values only for those bids listed within a defined time period during a bid session, those other bids being placed outside of the defined time period during the bid session are not reflected in displayed second and third indicator values.

10. The method of claim 1 further comprising a step of engaging the sliding button display by the merchant to accept a bid that has a value less than the highest vale bid.

11. The method of claim 1 wherein the prospective purchasers cannot access the sliding button display.

12. The method of claim 1 wherein the sliding button display is hidden from prospective purchasers.

13. The method of claim 1 wherein the displaying bid acceptance button further comprises a step of locating the bid acceptance value designator upon the length of the fixed axis at a numerical value that is less than the value of highest placed bid.

14. The method of claim 13 wherein the step of locating the bid acceptance value designator upon the length of the fixed axis is based upon several placed bids having the same bid value.

15. The method of claim 1 wherein the activating of the bid acceptance button is accomplished by the merchant.

16. The method of claim 1 further comprising a step of searching by the potential purchaser though an online single source retail item mega database containing the retail inventories of over seventy-five thousand retail merchants that the registered user accesses through the internet web portal to identify an item to place a bid upon.

17. The method of claim 1 wherein the merchant is one of over seventy-five thousand retail merchants whose combined retail item inventories are listed in an online single source retail item mega database that user accesses through the internet web portal to identify an item to place a bid upon.

* * * * *